US011888515B1

(12) United States Patent
Palese

(10) Patent No.: US 11,888,515 B1
(45) Date of Patent: Jan. 30, 2024

(54) SYSTEM AND METHOD FOR PARALLEL REAL-TIME PHOTONIC INTEGRATED CIRCUIT (PIC) OPTICAL PHASED ARRAY CALIBRATION AND ULTRAVIOLET LASER MICRO-RING WAVELENGTH OFFSET TRIMMING

(71) Applicant: Raytheon Company, Waltham, MA (US)

(72) Inventor: Stephen P. Palese, Redondo Beach, CA (US)

(73) Assignee: Raytheon Company, Tewksbury, MA (US)

( * ) Notice: Subject to any disclaimer, the term of this patent is extended or adjusted under 35 U.S.C. 154(b) by 21 days.

(21) Appl. No.: 17/812,634

(22) Filed: Jul. 14, 2022

(51) Int. Cl.
*H04B 10/00* (2013.01)
*H04B 10/11* (2013.01)
*H04B 10/516* (2013.01)
*H04J 14/00* (2006.01)

(52) U.S. Cl.
CPC ........... *H04B 10/11* (2013.01); *H04B 10/516* (2013.01)

(58) Field of Classification Search
CPC ... G02B 27/0087; G02F 1/292; G02F 1/2955; G01S 17/00; G01S 17/02
See application file for complete search history.

(56) References Cited

U.S. PATENT DOCUMENTS

| 3,975,628 | A | 8/1976 | Graves et al. |
| 7,408,507 | B1 | 8/2008 | Paek et al. |
| 7,729,572 | B1 | 6/2010 | Pepper et al. |
| 7,949,030 | B2 | 5/2011 | Volodin |
| 8,068,235 | B1 | 11/2011 | Marron et al. |
| 10,790,909 | B1 | 9/2020 | Suni |
| 10,838,222 | B2 | 11/2020 | Khachaturian et al. |
| 11,029,465 | B1 | 6/2021 | Rakowski et al. |
| 2006/0239312 | A1 | 10/2006 | Kewitsch et al. |
| 2010/0264300 | A1* | 10/2010 | Savchenkov ......... G02F 1/0123 250/227.24 |
| 2015/0293224 | A1 | 10/2015 | Eldada et al. |

(Continued)

FOREIGN PATENT DOCUMENTS

EP   3761528 A1   1/2021

OTHER PUBLICATIONS

Palese et al., "Photonic Integrated Circuit with Independent Unit Cells Having Multi-Polarization Sensitivity," U.S. Appl. No. 17/654,200, filed Mar. 9, 2022, 44 pages.

(Continued)

*Primary Examiner* — Daniel G Dobson

(57) ABSTRACT

A method includes obtaining a photonic integrated circuit having an optical phased array. The optical phased array includes multiple unit cells, and each unit cell includes (i) an antenna element configured to transmit or receive optical signals and (ii) a modulator configured to modify phases of the optical signals. The method also includes identifying center wavelengths of the modulators in the optical phased array. The method further includes directing ultraviolet illumination onto at least a subset of the unit cells simultaneously in order to change the center wavelengths of at least a subset of the modulators in the optical phased array. In addition, the method includes monitoring changes to the center wavelengths of at least the subset of the modulators in the optical phased array.

20 Claims, 13 Drawing Sheets

(56) References Cited

U.S. PATENT DOCUMENTS

| | | |
|---|---|---|
| 2015/0378241 A1 | 12/2015 | Eldada |
| 2016/0094016 A1 | 3/2016 | Beach et al. |
| 2017/0234984 A1 | 8/2017 | Khial et al. |
| 2017/0324162 A1 | 11/2017 | Khachaturian et al. |
| 2018/0039154 A1 | 2/2018 | Hashemi et al. |
| 2018/0107091 A1 | 4/2018 | Hosseini et al. |
| 2019/0260123 A1 | 8/2019 | Poulton et al. |
| 2019/0260124 A1 | 8/2019 | Davoyan et al. |
| 2020/0192179 A1 | 6/2020 | Hajimiri |
| 2020/0284910 A1 | 9/2020 | Yaacobi et al. |
| 2021/0067251 A1 | 3/2021 | Park et al. |
| 2021/0149227 A1 | 5/2021 | Lee et al. |
| 2021/0364695 A1 | 11/2021 | Shin et al. |
| 2022/0216922 A1* | 7/2022 | Hashemi ............. H04B 10/548 |
| 2022/0224413 A1 | 7/2022 | Shamee |
| 2022/0229343 A1 | 7/2022 | Kendrick et al. |
| 2022/0244578 A1 | 8/2022 | Palese et al. |
| 2022/0252786 A1 | 8/2022 | Yengst et al. |
| 2022/0252908 A1 | 8/2022 | Inamdar et al. |
| 2022/0255219 A1 | 8/2022 | Kendrick et al. |
| 2022/0255221 A1 | 8/2022 | Palese et al. |

OTHER PUBLICATIONS

Palese et al., "Photonic Integrated Circuit-Based Polarization-Independent Optical Devices," U.S. Appl. No. 17/659,789, filed Apr. 19, 2022, 44 pages.

Palese, "Photonic Integrated Circuit Multi-Wavelength Phase Modulator Networks," U.S. Appl. No. 17/806,873, filed Jun. 14, 2022, 53 pages.

Palese, "Photonic Integrated Circuit-Based Optical Communication Optimized for Receive Aperture Amplitude and Phase Modulations," U.S. Appl. No. 17/734,887, filed May 2, 2022, 48 pages.

Palese et al., "Photonic Integrated Circuit with Inverted H-Tree Unit Cell Design," U.S. Appl. No. 17/809,608, filed Jun. 29, 2022, 48 pages.

Palese, "Photonic Integrated Circuit Temporal and Frequency Dispersion Squint Correction for Optical Phased Array," U.S. Appl. No. 17/809,073, filed Jun. 27, 2022, 51 pages.

Palese, "Photonic Integrated Circuit-Based Transmissive/Reflective Wavefront Optical Phase Control," U.S. Appl. No. 17/662,797, filed May 10, 2022, 43 pages.

Kendrick et al., "Photonic Integrated Circuit-Based Imaging Systems," U.S. Appl. No. 17/654,204, filed Mar. 9, 2022, 35 pages.

Palese, "Multi-Node, Multi-Stream Photonic Integrated Circuit-Based Free-Space Optical Communication Device," U.S. Appl. No. 17/811,565, filed Jul. 8, 2022, 49 pages.

Palese et al., "Photonic Integrated Circuit (PIC)-Based Optical Phase Array with Integrated Gyroscope Sensor," U.S. Appl. No. 17/819,740, filed Aug. 15, 2022, 59 pages.

Zhou et al., "Towards Athermal Slotted Silicon Microring Resonators with UV-Trimmable PMMA Upper-Cladding," Optical Society of America, 2009, 2 pages.

Tan et al., "Silicon microring resonators," Journal of Optics, 2018, 8 pages.

Komljenovic et al., "On-chip calibration and control of optical phased arrays," Optics Express, vol. 26, No. 3, Feb. 2018, 12 pages.

Creedon et al., "High efficiency coherent beam combining of semiconductor optical amplifiers," Optics Letters, vol. 37, No. 23, Dec. 2012, 3 pages.

Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.

Heidel et al., "A Review of Electronic-Photonic Heterogeneous Integration at DARPA," IEEE Journal of Selected Topics in Quantum Electronics, vol. 22, No. 6, Nov. 2016, 9 pages.

Kim et al., "A Single-Chip Optical Phased Array in a Wafer-Scale Silicon Photonics / CMOS 3D-Integration Platform," IEEE Journal of Solid-State Circuits, vol. 54, Issue 11, Nov. 2019, 14 pages.

Larocque et al., "Beam steering with ultracompact and low-power silicon resonator phase shifters," Optics Express, vol. 27, No. 24, Nov. 2019, 16 pages.

Li et al., "Fast Optical Phased Array Calibration Technique for Random Phase Modulation LiDAR," IEEE Photonics Journal, vol. 11, No. 1, Feb. 2019, 10 pages.

Marron et al., "Atmospheric turbulence correction using digital holographic detection: experimental results," Optics Express, vol. 17, No. 14, Jul. 2009, 14 pages.

Marron et al., "Extended-range digital holographic imaging," Proc. of SPIE, vol. 7684 76841J, 2010, 6 pages.

Mehta et al., "An Optically Sampled ADC in 3D Integrated Silicon-Photonics/65nm CMOS," IEEE 2020 Symposium on VLSI Technology Digest of Technical Papers—THL.3, 2020, 2 pages.

Orcutt et al., "Open foundry platform for high-performance electronic-photonic integration," Optics Express, vol. 20, No. 11, May 2012, 11 pages.

Sayyah et al., "Two-dimensional pseudo-random optical phased array based on tandem optical injection locking of vertical cavity surface emitting lasers," Optics Express, vol. 23, No. 15, Jul. 2015, 12 pages.

Zhang et al., "Phase Calibration of On-Chip Optical Phased Arrays via Interference Technique," IEEE Photonics Journal, vol. 12, No. 2, Apr. 2020, 11 pages.

Kendrick et al., "Photonic Integrated Circuit Distance Measuring Interferometer," U.S. Appl. No. 16/929,907, filed Jul. 15, 2020, 35 pages.

Abediasl et al., "Monolithic optical phased-array transceiver in a standard SOI CMOS process", Optics Express, vol. 23, No. 5, Mar. 2015, 11 pages.

Office Action dated Sep. 16, 2021 in connection with U.S. Appl. No. 17/174,132, 18 pages.

International Search Report and Written Opinion of the International Searching Authority dated Feb. 24, 2022 in connection with International Patent Application No. PCT/US2021/059421, 16 pages.

International Search Report and Written Opinion of the International Searching Authority dated Apr. 8, 2022 in connection with International Patent Application No. PCT/US2021/064527, 10 pages.

Office Action dated Apr. 13, 2022 in connection with U.S. Appl. No. 17/174,132, 20 pages.

Blumenthal, "Silicon Nitride in Silicon Photonics," Proceedings of the IEEE, vol. 106, No. 12, Dec. 2018, 23 pages.

He et al., "Review of Photonic Integrated Optical Phased Arrays for Space Optical Communication," IEEE Access, vol. 8, Oct. 2020, 16 pages.

Notice of Allowance dated Aug. 17, 2022 in connection with U.S. Appl. No. 17/174,180, 10 pages.

Notice of Allowance dated Jun. 23, 2022 in connection with U.S. Appl. No. 17/174,132, 16 pages.

\* cited by examiner

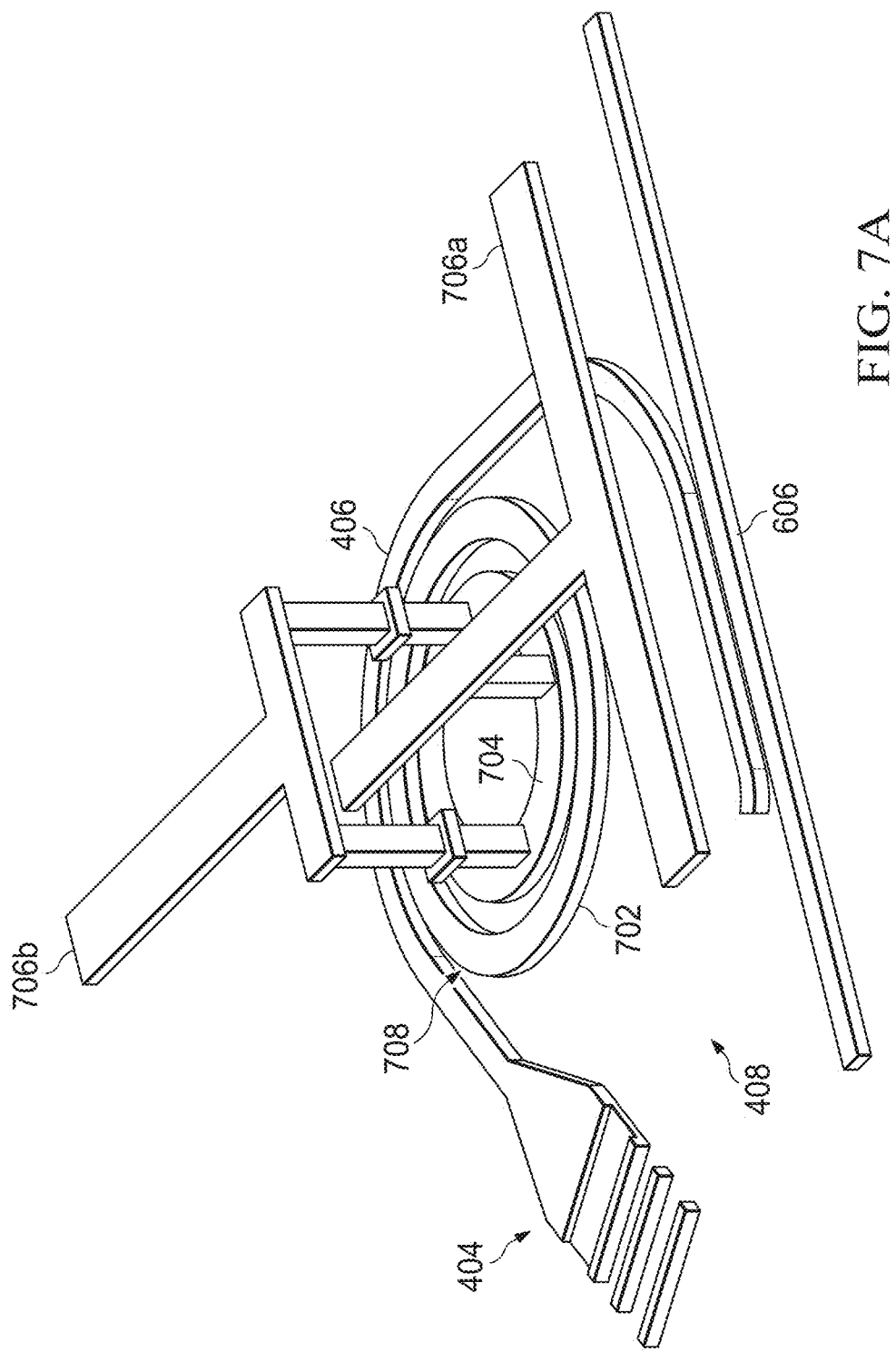

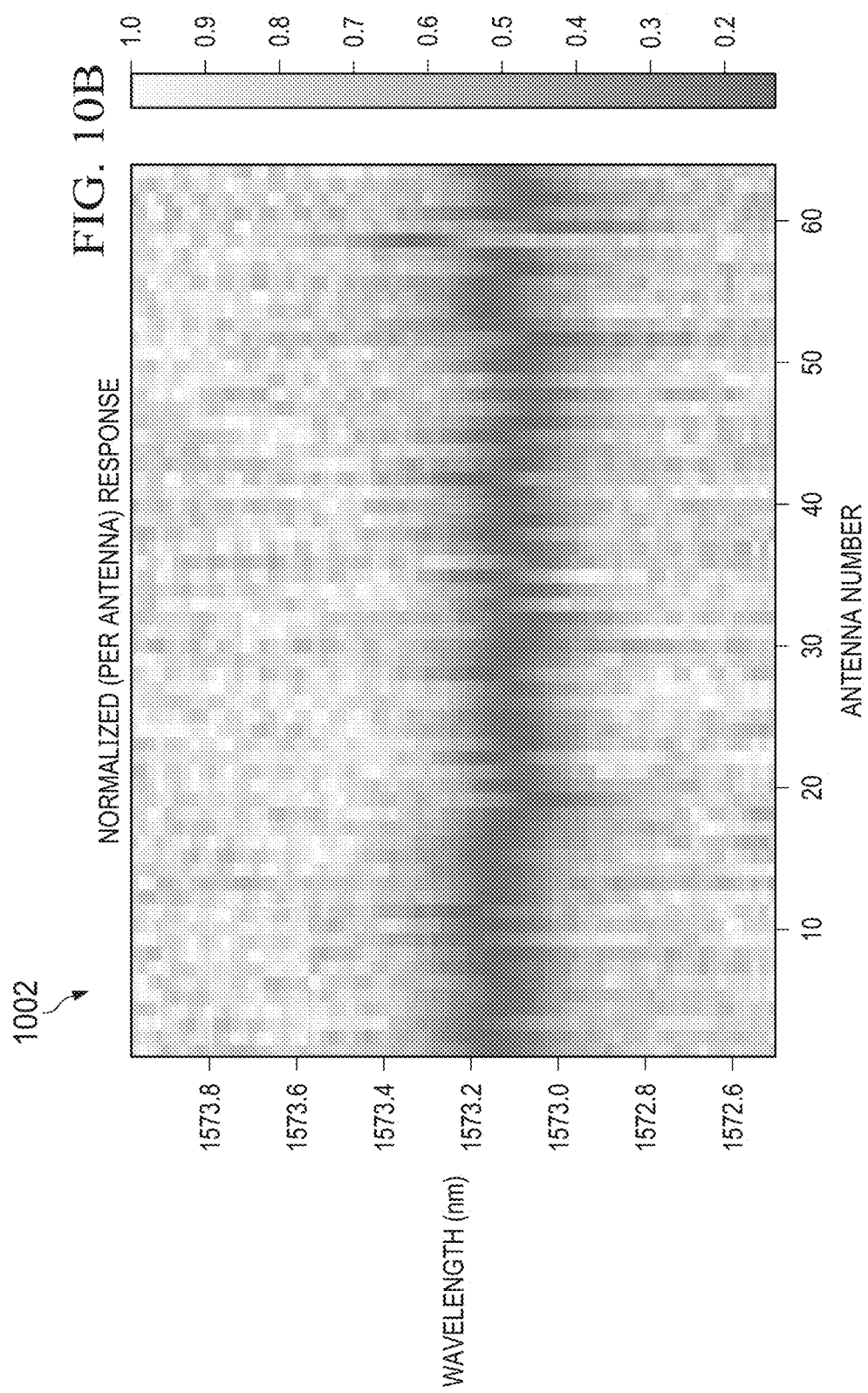

SYSTEM AND METHOD FOR PARALLEL REAL-TIME PHOTONIC INTEGRATED CIRCUIT (PIC) OPTICAL PHASED ARRAY CALIBRATION AND ULTRAVIOLET LASER MICRO-RING WAVELENGTH OFFSET TRIMMING

TECHNICAL FIELD

This disclosure relates generally to optical systems. More specifically, this disclosure relates to a system and method for parallel real-time photonic integrated circuit (PIC) optical phased array calibration and ultraviolet laser micro-ring wavelength offset trimming.

BACKGROUND

Next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

SUMMARY

This disclosure relates to a system and method for parallel real-time photonic integrated circuit (PIC) optical phased array calibration and ultraviolet laser micro-ring wavelength offset trimming.

In a first embodiment, a method includes obtaining a photonic integrated circuit having an optical phased array. The optical phased array includes multiple unit cells, and each unit cell includes (i) an antenna element configured to transmit or receive optical signals and (ii) a modulator configured to modify phases of the optical signals. The method also includes identifying center wavelengths of the modulators in the optical phased array. The method further includes directing ultraviolet illumination onto at least a subset of the unit cells simultaneously in order to change the center wavelengths of at least a subset of the modulators in the optical phased array. In addition, the method includes monitoring changes to the center wavelengths of at least the subset of the modulators in the optical phased array.

In a second embodiment, an apparatus is provided for use in calibrating a photonic integrated circuit having an optical phased array, where the optical phased array includes multiple unit cells and each unit cell includes (i) an antenna element configured to transmit or receive optical signals and (ii) a modulator configured to modify phases of the optical signals. The apparatus includes at least one processing device configured to identify center wavelengths of the modulators in the optical phased array, cause ultraviolet illumination to be directed onto at least a subset of the unit cells simultaneously in order to change the center wavelengths of at least a subset of the modulators in the optical phased array, and monitor changes to the center wavelengths of at least the subset of the modulators in the optical phased array.

In a third embodiment, a non-transitory computer readable medium is provided for use in calibrating a photonic integrated circuit having an optical phased array, where the optical phased array includes multiple unit cells and each unit cell includes (i) an antenna element configured to transmit or receive optical signals and (ii) a modulator configured to modify phases of the optical signals. The non-transitory computer readable medium contains instructions that when executed cause at least one processor to identify center wavelengths of the modulators in the optical phased array, cause ultraviolet illumination to be directed onto at least a subset of the unit cells simultaneously in order to change the center wavelengths of at least a subset of the modulators in the optical phased array, and monitor changes to the center wavelengths of at least the subset of the modulators in the optical phased array.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 7A and 7B illustrate example modulators in a photonic integrated circuit according to this disclosure;

FIGS. 10A and 10B illustrate example results from parallel real-time PIC-based optical phased array calibration and ultraviolet laser micro-ring wavelength offset trimming according to this disclosure;

DETAILED DESCRIPTION

Figure 1:
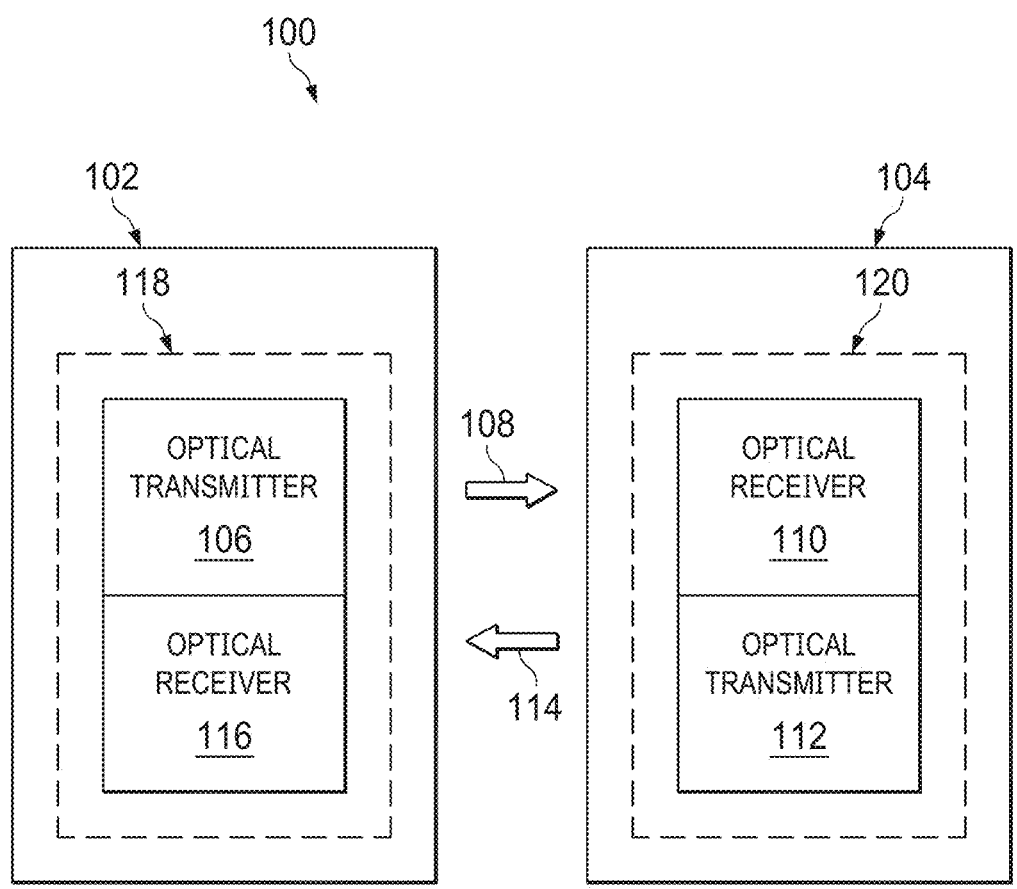
FIG. 1 illustrates an example system supporting photonic integrated circuit (PIC)-based optical phased arrays according to this disclosure.

FIGS. 1 through 11, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

As described below, an optical device may include a photonic integrated circuit having multiple unit cells. Each unit cell may include (i) an antenna element that can transmit or receive optical signals and (ii) a phase modulator that can be used to adjust the phases of the optical signals that are transmitted or received by the antenna element. Among other things, phase adjustments provided by the phase modulators in the unit cells may be used to perform electronic beam steering or other functions. In some cases, the phase modulators in the unit cells may be fabricated using resonant micro-ring phase modulators or PN junction micro-ring modulators, each of which represents a phase modulator formed using a ring that resonates at a controllable resonant frequency. The resonant frequency may be based on the temperature of the phase modulator, so modifying the temperatures of the phase modulators can adjust their resonant frequencies and thereby adjust the phases of the optical signals flowing through the phase modulators.

Unfortunately, one issue affecting these types of phase modulators is that manufacturing tolerances can result in slight modifications to the designs of the phase modulators during fabrication. Because of this, different phase modulators may have slightly different center wavelengths (associated with their strongest resonant frequencies) even when at the exact same temperature. These differences can often be expressed as "offsets" of the actual center wavelengths from a nominal or desired center wavelength. As a result, phase modulators often require calibration during fabrication, which can increase the difficulty of the fabrication process. Moreover, a constant control power may need to be applied to the phase modulators during operation in order to compensate for any offsets, which can lead to increased electrical power draw by a photonic integrated circuit as a whole.

This disclosure provides a system and method for parallel real-time PIC-based optical phased array calibration and ultraviolet laser micro-ring wavelength offset trimming. As described in more detail below, a heterodyne calibration technique is disclosed, which can be used to customize phase modulators in photonic integrated circuits during fabrication. As part of this process, the heterodyne calibration technique can utilize an extra image plane in the heterodyne calibration setup in order to inject spatially-controllable and temporally-controllable ultraviolet (UV) laser light from a UV laser source. In some embodiments, for instance, the UV laser light forming the extra image plane can be injected backwards through a microscope being used as part of the heterodyne calibration technique. The UV laser light is used to modify the index of refraction of at least portions of the phase modulators in a photonic integrated circuit, such as by modifying the index of refraction of a fused silica cladding or other material around each phase modulator. This helps to correct for offsets in the center wavelengths of the phase modulators caused by manufacturing tolerances or other issues.

In some embodiments, real-time measurements can be used to determine when offset correction has been completed for individual phase modulators or for collections of phase modulators. Also, in some embodiments, the UV laser light source can be spatially-controllable so that the resulting UV laser light takes at least one desired form, such as an arc, circle, annulus, pair of concentric annuluses, or any other suitable shape, to match the spatial shape of each phase modulator. In some cases, a spatially-controlled light source can be produced using a diffractive optic or external optical phased array (such as a liquid crystal array) to provide a large number of illumination locations (such as a 32×32 array of illumination locations or larger), which allows numerous phase modulators to be processed in parallel. In particular embodiments, the UV laser light may be made to have a uniform-step far-field in order to more carefully control the index of refraction modifications or to minimize exposure of other closely-spaced photonics components to the UV laser light. Further, in some embodiments, an element-by-element temporally-controllable UV laser light source can be used in order to individually tailor exposure times and center wavelength correction magnitudes of individual phase modulators or collections of phase modulators.

In this way, the described approaches allow for phase modulators used in photonic integrated circuits to be tailored so that their center wavelengths are closer to one or more desired values, such as when all phase modulators have center wavelengths that closely match one another. Also, spatial control, temporal control, or both can be supported in order to ensure that individual phase modulators or collections of phase modulators are properly tuned. Further, spatial control may be highly customizable in order to support processing of phase modulators having various shapes and sizes. In addition, the ability to simultaneously process numerous phase modulators can facilitate offset correction in large optical phased arrays (such as those having over one million phase modulators). Finally, assuming resonances of phase modulators can be tailored so that they overlap, the power draw needed to operate a photonic integrated circuit and achieve desired phasing of optical signals can be significantly reduced. This is because active correction of the center wavelengths of the phase modulators can be replaced by passive compensation techniques, which can eliminate the circuitry used for static calibration control and thereby reduce circuit complexities and reduce electrical power draw requirements.

FIG. 1 illustrates an example system 100 supporting PIC-based optical phased arrays according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes.

As described in more detail below, each optical transmitter 106 and 112, optical receiver 110 and 116, or optical transceiver 118 and 120 may be implemented using at least one PIC-based optical phased array, which is used to transmit or receive the optical signals 108 and 114. Also, as described in more detail below, phase modulators used in each PIC-based optical phased array can be tailored in order to precise tune the center wavelengths of the phase modulators. This helps to facilitate simpler control of the optical phased arrays and reduces the power consumption needed to operate the optical phased arrays.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. As a particular example, optical transmitters, receivers, or transceivers may be used in optical 5G networks or other telecommunication networks that support optical communications. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting PIC-based optical phased arrays, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2:
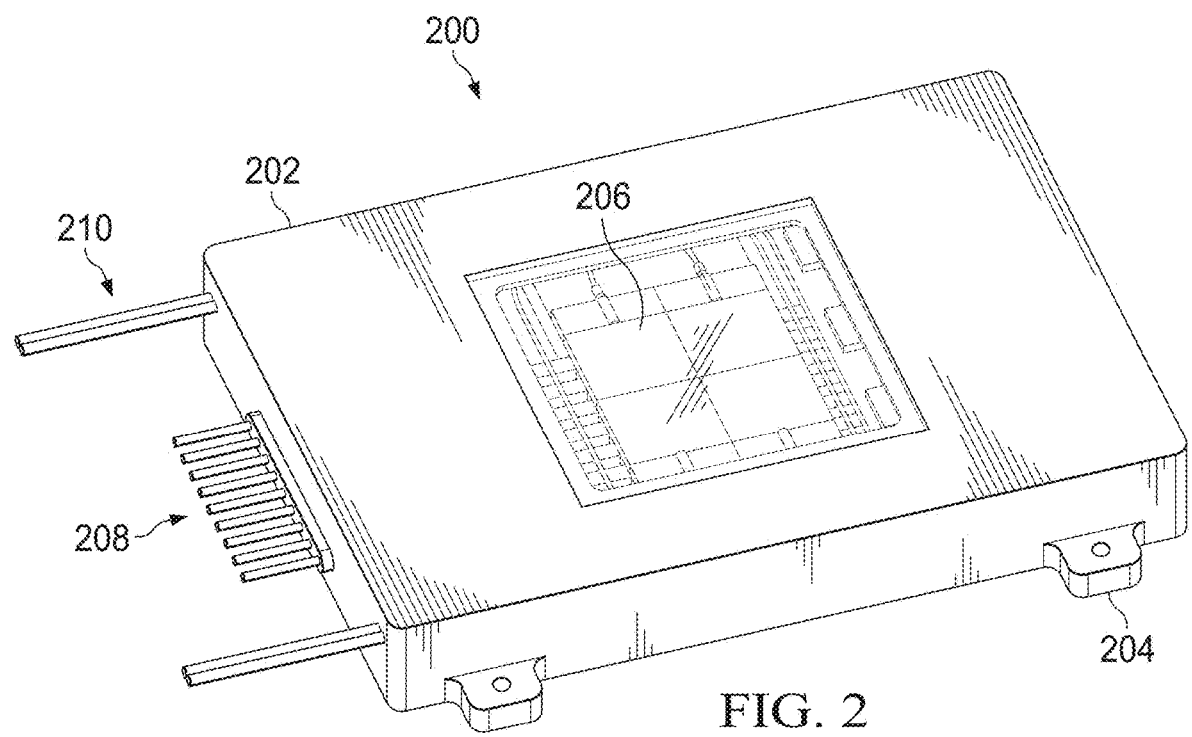
FIGS. 2 through 4 illustrate an example photonic integrated circuit-based. optical device supporting a PIC-based optical phased array according to this disclosure.
Figure 3:
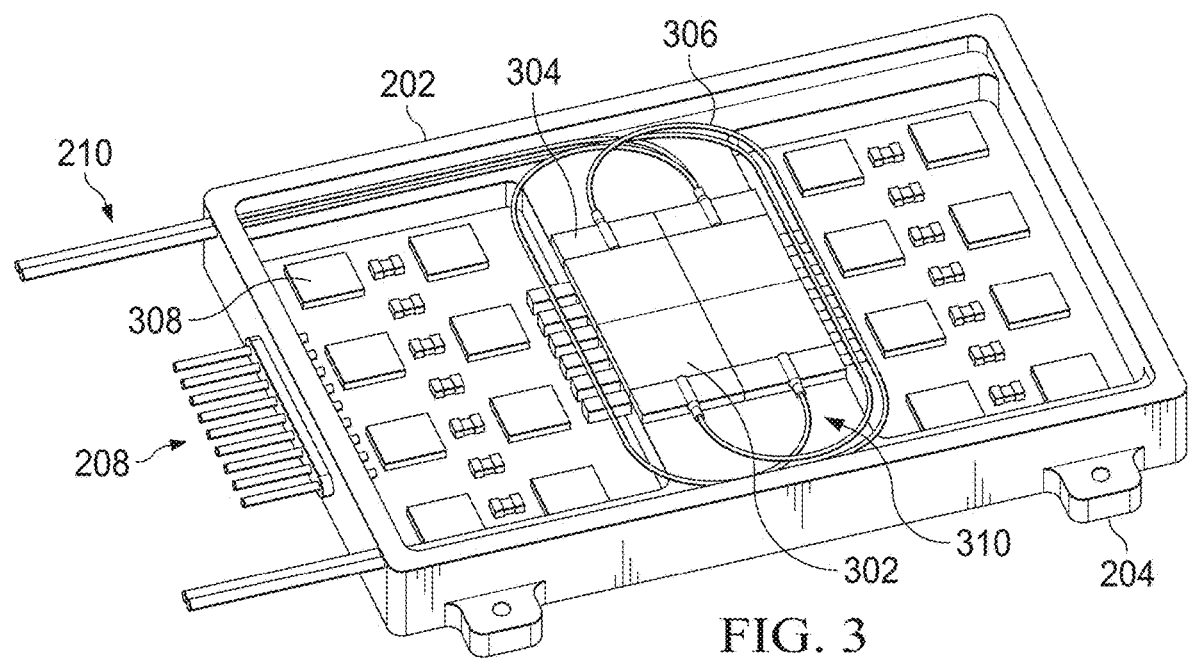
Figure 4:
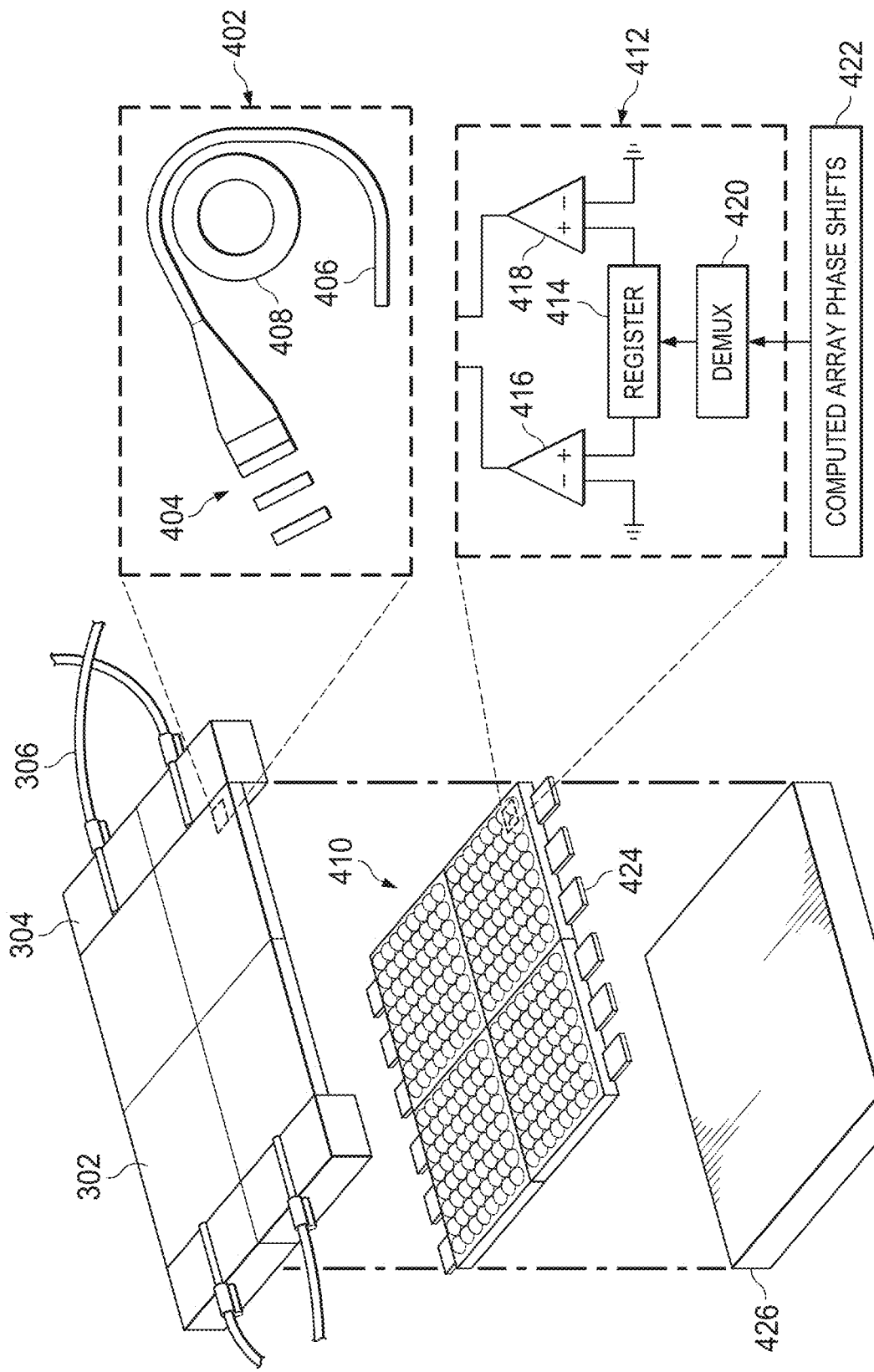

FIGS. 2 through 4 illustrate an example photonic integrated circuit-based optical device 200 supporting a PIC-based optical phased array according to this disclosure. For ease of explanation, the optical device 200 may be described as being used to implement each optical transmitter 106 and 112, optical receiver 110 and 116, or optical transceiver 118 and 120 in FIG. 1. However, the optical device 200 may be used in any other suitable device and in any other suitable system.

As shown in FIG. 2, the optical device 200 includes a package 202, which surrounds and protects electronic and optical components of an optical transmitter, optical receiver, or optical transceiver. For example, the package 202 may encase and form a hermetic seal around the electronic and optical components. The package 202 may be formed from any suitable material(s), such as one or more metals, and in any suitable manner. In some embodiments, the package 202 is formed using a nickel-cobalt or nickel-iron alloy (such as KOVAR) or other material that has a coefficient of thermal expansion closely matched to that of borosilicate or other glass. The package 202 may also have any suitable size, shape, and dimensions. In some cases, the package 202 may be formed in multiple parts that can be bonded, sealed, or otherwise coupled together to enclose the electronic and optical components. For instance, the package 202 may be formed using a larger lower portion and an upper cover such that the electronic and optical components can be inserted into the lower portion and the upper cover can be connected to the lower portion. Also, in sonic cases, the package 202 may include flanges 204 that support mounting of the package 202 to a larger structure. However, the package 202 may have any other suitable form.

The package 202 includes an optical window 206, which is substantially or completely transparent optically (at least with respect to the optical signals being transmitted from or received by the optical device 200). The optical window 206 may be formed from any suitable material(s), such as borosilicate glass or other glass, and in any suitable manner. The optical window 206 may also have any suitable size, shape, and dimensions. In some cases, the optical window 206 may also function as a bandpass or other optical filter that filters the wavelength(s) of the optical signals being transmitted from or received by the optical device 200.

The package 202 may also include one or more electrical feedthroughs 208, which represent one or more electrical connections that can be used to transport one or more electrical signals between the interior and the exterior of the package 202. The one or more electrical signals may be used here for any suitable purposes, such as to control one or more operations of the optical device 200. As a particular example, the one or more electrical signals may be used for controlling the phases of antenna elements of a photonic integrated circuit in the optical device 200. The package 202 may further include one or more fiber inputs/outputs 210, which can be used to provide one or more input signals to the optical device 200 or receive one or more output signals from the optical device 200. For instance, the one or more input signals may carry information to be transmitted from the optical device 200, and the one or more output signals may carry information received at and recovered by the optical device 200. In this example, there are two fiber inputs/outputs 210, although the optical device 200 may include a single fiber input/output 210 or more than two fiber inputs/outputs 210. Note, however, that no fiber inputs/outputs 210 may be needed if all optical generation and processing occurs using components within the package 202, in which case the electrical feedthroughs 208 may be used to transport information or other signals to or from the optical device 200.

As shown in FIG. 3, a photonic integrated circuit 302 is positioned within the package 202, namely at a location where the photonic integrated circuit 302 can transmit or receive optical signals through the optical window 206. As described below, the photonic integrated circuit 302 can include unit cells containing antenna elements and phase modulators, where the phase modulators can be tuned using UV illumination. The photonic integrated circuit 302 may be formed from any suitable material(s), such as silicon, indium phosphide, or gallium arsenide, and in any suitable manner. The photonic integrated circuit 302 may also have any suitable size, shape, and dimensions. As a particular example, the photonic integrated circuit 302 may be square and have an edge length of about 40 mm, although any other suitable sizes and shapes may be used here.

Fiber mounts 304 are used to couple to optical fibers 306 at locations where the optical fibers 306 can provide optical signals to or receive optical signals from the photonic integrated circuit 302. For example, the optical fibers 306 may provide optical signals from a source laser to the photonic integrated circuit 302 for use during outgoing transmissions. The optical fibers 306 may also or alternatively provide optical signals received by the photonic integrated circuit 302 to a receiver for processing. Each fiber mount 304 includes any suitable structure configured to be coupled to an optical fiber 306. Each optical fiber 306 represents any suitable length of an optical medium configured to transport optical signals to or from a photonic integrated circuit 302. Note that while four fiber mounts 304 and four optical fibers 306 are shown here, the optical device 200 may include, one, two, three, or more than four fiber mounts 304 and optical fibers 306. Also note that no fiber mounts 304 and optical fibers 306 may be needed if all optical generation and processing occurs using components of the photonic integrated circuit 302.

An electronic control board 308 includes electronic components, such as one or more integrated circuit chips and other components, that control the operation of the photonic integrated circuit 302. For example, the electronic control board 308 may include one or more components that calculate desired phases or phase corrections for optical signals to be transmitted by antenna elements of the photonic integrated circuit 302, which allows the electronic control board 308 to control functions such as beam forming or beam steering operations. Also or alternatively, the electronic control board 308 may include one or more components that calculate desired phases or phase corrections to be applied to optical signals received by antenna elements of the photonic integrated circuit 302, which allows the electronic control board 308 to control functions such as wavefront reconstruction operations. The electronic control board 308 includes any suitable components configured to perform one or more desired functions related to a photonic integrated circuit 302.

Spacers 310 may be positioned on opposite sides of the photonic integrated circuit 302 and used to help separate the optical fibers 306 from the electronic control board 308. The spacers 310 may be formed from any suitable material(s), such as ceramic, and in any suitable manner.

As shown in FIG. 4, the photonic integrated circuit 302 includes a number of unit cells 402. Each unit cell 402 is configured to transmit or receive one or more optical signals. The photonic integrated circuit 302 can include any suitable number of unit cells 402, possibly up to and including a very large number of unit cells 402. In some embodiments, for example, the photonic integrated circuit 302 may include an array of unit cells 402 up to a size of 1024×1024 (meaning over one million unit cells 402), 2048×2048 (meaning over four million unit cells 402), or even larger. The size of the photonic integrated circuit 302 is based, at least in part, on the number and size of the unit cells 402. As noted above, in sonic cases, the photonic integrated circuit 302 may be square with edges of about 40 mm in length. However, the photonic integrated circuit 302 may be scaled to smaller or larger sizes (such as about 2.5 cm by about 2.5 cm), while further scaling up to even larger sizes (such as about 20 cm by about 20 cm or about 30 cm by about 30 cm) may be possible depending on fabrication capabilities.

Each unit cell 402 includes an antenna element 404, which is configured to physically transmit or receive one or more optical signals to or from one or more external devices or systems. For example, each antenna element 404 may represent a nanophotonic antenna or other antenna element that transmits or receives at least one optical signal, along with one or more lenses or other optical devices configured to focus or otherwise process the at least one optical signal. Depending on the implementation, the antenna element 404 may sometimes be referred to as an emitter in a transmitting array or a receiver in a receiving array. Each antenna element 404 may have any suitable size, shape, and dimensions. In some cases, the emitting/receiving surface of the antenna element 404 may be about 3 μm to about 4 μm in diameter. Note that while a single antenna element 404 is shown here, each unit cell 402 may include multiple antenna elements 404, such as when two antenna elements 404 are arranged orthogonally or substantially orthogonally with respect to one another. This arrangement may, for instance, provide the unit cells 402 with multi-polarization sensitivity.

Each antenna element 404 here is coupled to a signal pathway 406. The signal pathways 406 are configured to transport optical signals to or from the antenna elements 404. For example, the signal pathways 406 can provide optical signals to the antenna elements 404 for transmission. Also or alternatively, the signal pathways 406 can provide optical signals received by the antenna elements 404 to optical detectors or other components for processing. Each signal pathway 406 includes any suitable structure configured to transport optical signals, such as an optical waveguide. Note that only a portion of the signal pathway 406 may be shown in FIG. 4, since a signal pathway 406 can vary based on how the associated unit cell 402 is designed and positioned within the photonic integrated circuit 302.

Modulators 408 are provided in the unit cells 402 for the antenna elements 404 and are used (among other things) to control the phases of optical signals transmitted or received by the associated antenna elements 404. For example, when the antenna elements 404 are transmitting, the modulators 408 can be used to achieve desired phases of outgoing optical signals in order to support functions such as beam forming or beam steering. When the antenna elements 404 are receiving, the modulators 408 can be used to apply phase control to the incoming wavefront of received optical signals in order to support functions such as decomposing or reconstructing the wavefront. Each modulator 408 includes any suitable structure configured to modulate the phase of an optical signal, such as a resonant micro-ring modulator or a PN junction micro-ring modulator. In some cases, each modulator 408 may be a resonant micro-ring modulator that is about 5.5 μm in diameter, although modulators of other sizes may be used here.

The modulators 408 of the photonic integrated circuit 302 are electrically coupled to a digital read in integrated circuit (DRIIC) layer 410, which is used to provide electrical signals to the modulators 408 in order to control the phase modulations applied to the incoming or outgoing optical signals by the modulators 408. In some embodiments, the photonic integrated circuit 302 can be "flip-chip" bonded to the DRIIC layer 410, although other mechanisms for electrically coupling the photonic integrated circuit 302 and the DRIIC layer 410 may be used.

The DRIIC layer 410 in this example includes a number of individual DRIIC cells 412, where each DRIIC cell 412 may be associated with (and in some cases may have about the same size as) a corresponding one of the unit cells 402. The DRIIC cells 412 control the phase modulations that are applied by the modulators 408 of the unit cells 402. The DRIIC cells 412 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 412 may operate to convert digital values into suitable DC analog voltages between 0 V and 3.3 V although other voltages (including negative voltages) can be supported depending on the implementation.

In this example, each DRIIC cell 412 may include a register 414 configured to store values associated with different phase shifts to be applied by the modulator 408 of its corresponding unit cell 402. To provide a desired phase shift, appropriate values from the register 414 are selected and provided to two amplifiers 416 and 418, which generate output voltages that are provided to the associated modulator 408. The output voltages control the phase shift provided by the associated modulator 408. Different values from the register 414 are provided to the amplifiers 416 and 418 over time so that different output voltages are applied to the associated modulator 408. In this way, each DRIIC cell 412 can cause its associated modulator 408 to provide different phase shifts over time, thereby supporting various functions like beam forming, beam steering, or wavefront reconstruction.

In some embodiments, each DRIIC cell 412 may be used to provide a relatively small number of different output voltages to its associated modulator 408. For example, in some cases, each DRIIC cell 412 can cause the associated modulator 408 to provide four different phase shifts. However, other numbers of output voltages and associated phase shifts may be supported here, such as when up to 256 different phase shifts or more are supported. Also, the output voltages provided to the modulators 408 by different DRIIC cells 412 may be different even when those modulators 408 are providing the same phase shift, which may be due to factors such as manufacturing tolerances. The actual output voltages used for each modulator 408 can be selected during calibration so that appropriate values may be stored in each register 414.

In this example, the actual values in each DRIIC cell 412 that are provided to the amplifiers 416 and 418 by the register 414 over time can be controlled using a demultiplexer 420. Each demultiplexer 420 receives a stream of computed array phase shifts 422 and outputs the phase shifts 422 that are to be applied by that DRIIC cell's associated modulator 408. The phase shifts 422 output by the demultiplexer 420 can identify or otherwise to be used to select specific values from the register 414 to be output to the amplifiers 416 and 418. The computed array phase shifts 422 here may be provided by one or more external components, such as the electronic control board 308 or an external component communicating with the electronic control board 308. While not shown here, array-level deserialization circuitry may be used to separate and fan out high-speed digital signals to the array of individual DRIIC cells 412.

Each register 414 includes any suitable structure configured to store and retrieve values. Each amplifier 416 and 418 includes any suitable structure configured to generate a control voltage or other control signal based on an input. Each demultiplexer 420 includes any suitable structure configured to select and output values.

Note that this represents one example way in which the modulators 408 of the unit cells 402 can be controlled. In general, any suitable technique may be used to provide suitable control voltages or other control signals to the modulators 408 for use in controlling the phase shifts provided by the modulators 408. For example, the approach shown in FIG. 4 allows values that are applied to the amplifiers 416 and 418 to be stored in the register 414 and retrieved as needed, which allows an external component to provide indicators of the desired values to be retrieved to the DRIIC cells 412. In other embodiments, an external component may provide digital values that are converted by different circuitry into analog values.

Various electrical connections 424 are provided in or with the DRIIC layer 410. The electrical connections 424 may be used to provide electrical signals to the DRIIC cells 412, such as when the electrical connections 424 are used to receive high-speed digital signals containing the computed array phase shifts 422 for the DRIIC cells 412. Any suitable number and arrangement of electrical connections 424 may be used here.

A thermal spreader 426 can be positioned in thermal contact with the DRIIC layer 410. The thermal spreader 426 helps to provide a more consistent temperature across the DRIIC layer 410 and the photonic integrated circuit 302 by functioning as a heat sink that removes thermal energy from the DRIIC layer 410 and the photonic integrated circuit 302. At times, the thermal spreader 426 may also provide thermal energy to the DRIIC layer 410, which helps to heat the DRIIC layer 410 and the photonic integrated circuit 302. Thermal energy that is generated by the DRIIC layer 410 or injected into the photonic integrated circuit 302 may vary over time, and the thermal spreader 426 can help to maintain a substantially constant temperature of the photonic integrated circuit 302. The thermal spreader 426 may be formed from any suitable material(s), such as one or more metals like copper, and in any suitable manner. The thermal spreader 426 may also have any suitable size, shape, and dimensions.

Although FIGS. 2 through 4 illustrate one example of a photonic integrated circuit-based optical device 200 supporting a PIC-based optical phased array, various changes may be made to FIGS. 2 through 4. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits.

Figure 5:
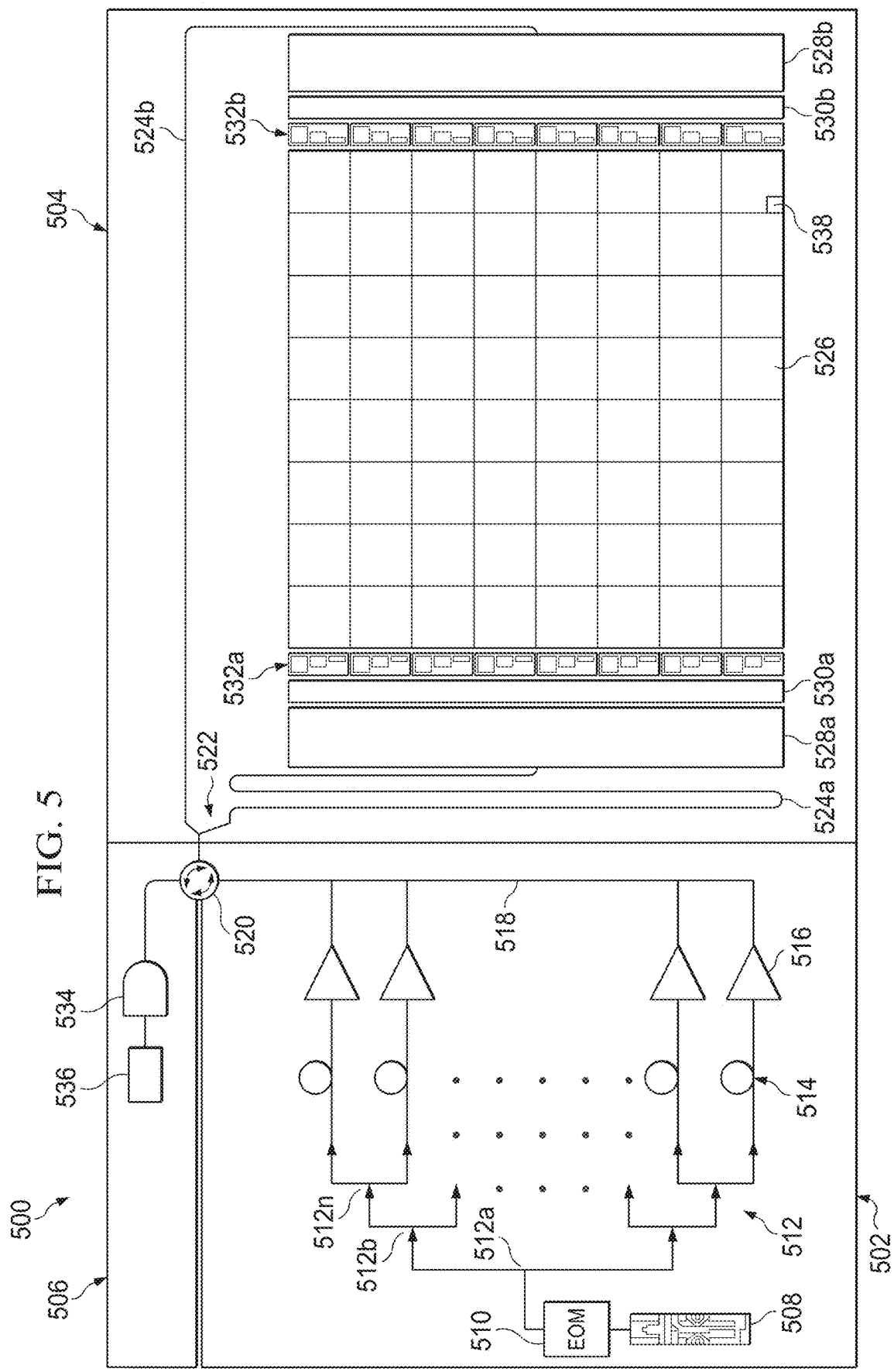
FIGS. 5 and 6 illustrate an example architecture of a photonic integrated circuit supporting a PIC-based optical phased array according to this disclosure.
Figure 6:
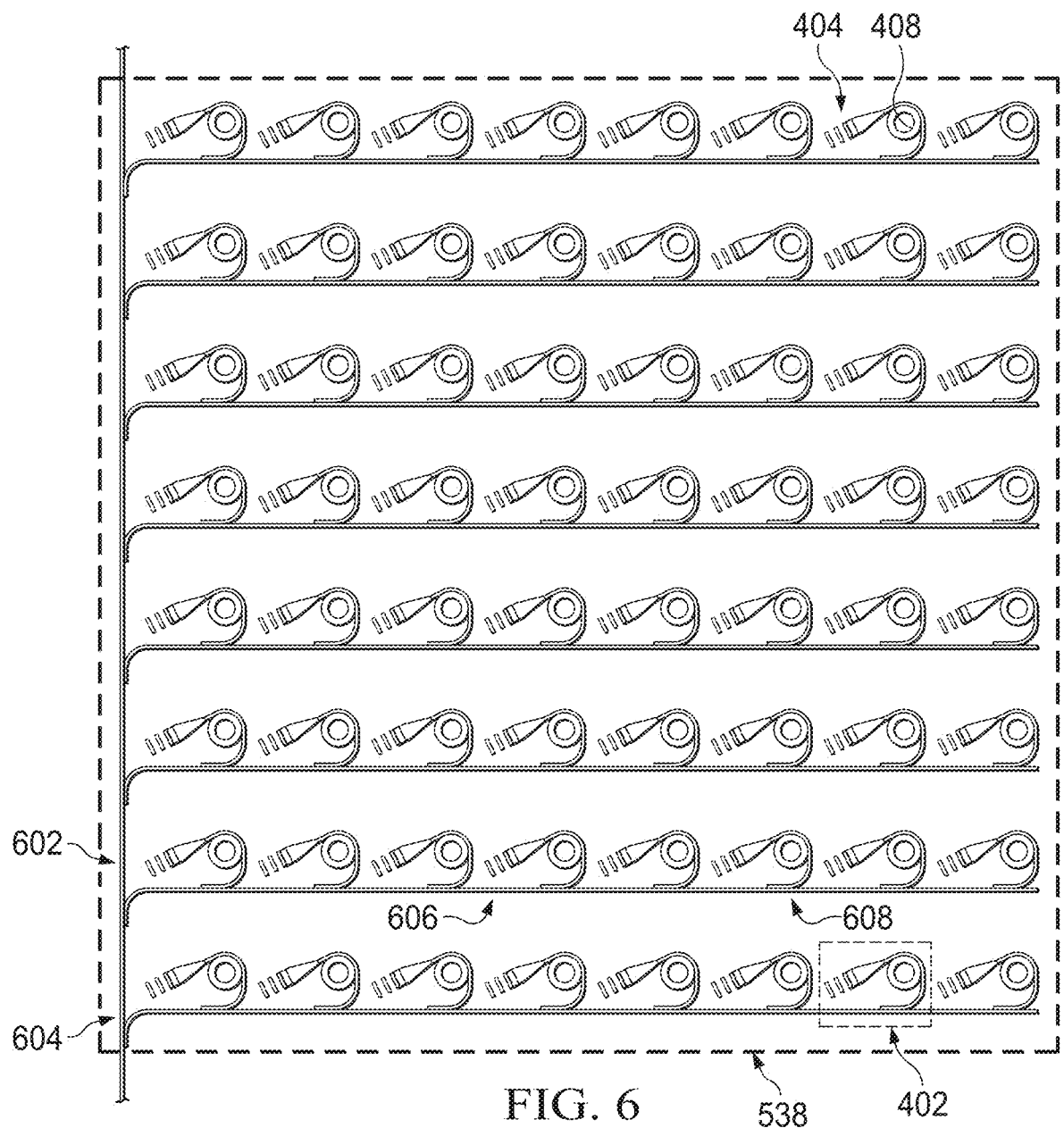

FIGS. 5 and 6 illustrate an example architecture 500 of a photonic integrated circuit supporting a PIC-based optical phased array according to this disclosure. For example, the architecture 500 may represent an example implementation of the photonic integrated circuit-based optical device 200 of FIGS. 2 through 4. In particular, the example architecture 500 of FIGS. 5 and 6 may be implemented within or using the photonic integrated circuit 302 of the optical device 200.

As shown in FIG. 5, the architecture 500 includes a source laser 502, an OPA 504, and a receiver 506. The source laser 502 generally operates to produce optical signals that are used by the OPA 504 to transmit outgoing optical signals. The OPA 504 generally operates to transmit outgoing optical signals and to receive incoming optical signals. The receiver 506 generally operates to process the incoming optical signals. These components allow the architecture 500 to support optical transceiver functionality, although some components may be removed from the architecture 500 if only optical transmitter or only optical receiver functionality is desired.

In this example, the source laser 502 includes a laser 508, which operates to produce a lower-power input beam. The laser 508 includes any suitable structure configured to generate a laser output, such as a distributed feedback (DFB) diode laser. The lower-power input beam can have any suitable power level based on the laser 508 being used for a specific application. In some cases, the lower-power input beam may have a power level of one or several tens of milliwatts to one or several hundreds of milliwatts, although these values are for illustration only. Also, in some cases, the laser 508 may be fabricated using at least one group III element and at least one group V element and may therefore be referred to as a "III-V" laser. However, any other suitable materials may be used to fabricate the laser 508. The lower-power input beam is provided to an electro-optic modulator (EOM) 510, which can modulate the lower-power input beam based on an input electrical signal. The EOM 510 can provide any suitable modulation here, such as amplitude or phase modulation. In some embodiments, the EOM 510 is implemented as a Mach-Zehnder modulator (MZM).

A splitter 512 generally operates to split the modulated input beam into optical signals traveling over different optical pathways. In this example, the splitter 512 includes a hierarchical arrangement of splitters 512a-512n, each of which can receive and split an optical input in order to produce two optical outputs of substantially equal power. Note that the number of splitters 512a-512n and the number of hierarchical levels of splitters 512a-512n can vary based on the number of optical signals to be produced. For example, there may be five levels of splitters if thirty-two optical signals are desired or six levels of splitters if sixty-four optical signals are desired. Note, however, that other numbers of optical signals may be produced using any suitable number of splitters. Also note that any other suitable structure(s) may be used to split an optical signal, such as a multi-mode interferometer or a coupler tree.

The optical signals from the splitter 512 can be phase shifted using an array of phase shifters 514, where each phase shifter 514 can shift the phase of one of the optical signals. Each phase shifter 514 includes any suitable structure configured to phase-shift an optical signal, such as a resonant micro-ring modulator. In some embodiments, the resonant micro-ring modulators may be silicon-based and have diameters of about 5 microns to about 6 microns, although other implementations of the phase shifters 514 may be used.

The phase-shifted optical signals are provided to an array of semiconductor optical amplifiers (SOAs) 516. Each semiconductor optical amplifier 516 amplifies one of the phase-shifted optical signals to produce a higher-power version of that optical signal. Each semiconductor optical amplifier 516 represents any suitable semiconductor-based amplifier configured to amplify an optical signal. Each of the amplified optical signals can have any suitable power level based on the semiconductor optical amplifiers 516 being used. In some cases, the amplified optical signals may each have a power level of about three watts, although this value is for illustration only. The amplified optical signals can be combined and transported over an optical waveguide 518, which allows for source-coherent combination of the outputs from the semiconductor optical amplifiers 516 (since the amplifiers 516 can form a phase-locked array of SOAs). The combined signal is provided to a circulator 520, which provides the combined signal to the OPA 504.

In the OPA 504, the combined signal is split by a splitter 522 so that substantially equal first portions of the combined signal are provided to two waveguides 524a-524b. The waveguides 524a-524b here may have substantially the same length so that there is little or no phase difference between the first portions of the combined signal exiting the waveguides 524a-524b. In this example, the photonic integrated circuit 302 is implemented using supercells 526, where each supercell 526 includes a subset of the unit cells 402. In some embodiments, for example, each supercell 526 may include a 32×32 arrangement of unit cells 402, although other numbers and arrangements of unit cells 402 may be used in each supercell 526. In this particular example, the photonic integrated circuit 302 includes sixty-four supercells 526, although other numbers of supercells 526 may be used. Multiple supercells 526 can be driven using the same portion of the combined signal from the source laser 502, which helps to simplify phase control and other operations in the architecture 500. The ability to drive all unit cells 402 in a supercell 526 collectively allows, for instance, amplitude modulation of each supercell 526 to control the transmit power of the unit cells 402 in that supercell 526.

In order to drive the supercells 526 using the combined signal from the source laser 502, the waveguides 524a-524b provide the first portions of the combined signal to splitters 528a-528b, such as 1×8 optical splitters, which split the first portions of the combined signal into more-numerous second portions of the combined signal. Additional splitters 530a-530b, such as 8×32 splitters, split the second portions of the combined signal into even more-numerous third portions of the combined signal. This results in the creation of sixty-four optical signals, which can be used to drive the supercells 526. Note that this arrangement of 1×8 and 8×32 splitters is merely one example of how the supercells 526 in this specific photonic integrated circuit 302 may be driven. Other approaches may be used to drive a photonic integrated circuit 302, including approaches that use other numbers or arrangements of splitters. The specific approach shown in FIG. 5 is merely one example of how supercells 526 of this specific photonic integrated circuit 302 may be driven.

Time delay paths 532a-532b are provided between the splitters 530a-530b and the supercells 526 in order to compensate for different optical path lengths to reach the different supercells 526. For example, assume that each row of supercells 526 in the photonic integrated circuit 302 is driven using four outputs from the splitter 530a and four outputs from the splitter 530b. Without compensation, different outputs from the splitters 530a-530b would reach different supercells 526 at different times, which can create undesired phase differences and reduce the throughput of the architecture 500. The time delay paths 532a-532b represent spiraled or other optical pathways that delay at least some of the outputs from the splitters 530a-530b so that the outputs from the splitters 530a-530b reach all supercells 526 at substantially the same time. For example, the time delay paths 532a-532b may delay signals to closer supercells 526 by larger amounts and delay signals to farther supercells 526 by smaller or no amounts. The optical signals that are received at the supercells 526 are used by the supercells 526 to produce outgoing optical signals.

The supercells 526 may also receive incoming optical signals, which can be transported over the waveguides 524a-524b and through the circulator 520 to the receiver 506. In this example, the receiver 506 includes at least one photodetector 534, such as at least one photodiode that converts the received incoming optical signals into electrical currents. A transimpedance amplifier 536 converts the electrical currents into electrical voltages, which can then be further processed (such as to recover information contained in the incoming optical signals).

Note that the source laser 502 and various components of the OPA 504 may be fabricated from different materials in order to allow for different optical power levels to be used in the architecture 500. For example, components of the source laser 502 may be fabricated using silicon nitride, germanium, or other materials that allow the source laser 502 to generate a relatively high-power combined beam for the OPA 504. In the OPA 504, the waveguides 524a-524b and the splitters 528a-528b may similarly be fabricated using silicon nitride or other materials that support the transport and splitting of the relatively high-power combined beam from the source laser 502. The splitters 530a-530b may be fabricated using silicon (rather than silicon nitride) or other materials that can split lower-power optical signals (since the optical energy from the source laser 502 has already been split at this point). However, the components of the architecture 500 may be fabricated from any other suitable materials. Also note that various components of the architecture 500 may or may not be fabricated using one or more common materials.

A portion 538 of one of the supercells 526 is identified in FIG. 5 and shown in greater detail in FIG. 6. As shown in FIG. 6, this portion 538 of the supercell 526 includes an 8×8 arrangement of unit cells 402, where each unit cell 402 has the same or similar structure to that shown in FIG. 4. As can be seen here, the unit cells 402 are fed using a feed path 602, where splitters 604 are positioned along the feed path 602 to split off portions of an optical signal. These portions of the optical signals are provided over feed paths 606, where splitters 608 are positioned along the feed paths 606 to further split off portions of the optical signal. Ideally, the splitters 604 and 608 are configured such that each of the unit cells 402 receives a substantially equal portion of the optical signal input to the feed path 602. In some embodiments, the teed paths 602, 606 and splitters 604, 608 may be formed from silicon, although other materials may be used here.

In FIG. 6, it can be seen that different path lengths exist between the input of the feed path 602 (located at the bottom of the feed path 602 in FIG. 6) and different unit cells 402. In this particular example, the shortest path length exists between the input of the feed path 602 and the bottom left unit cell 402, and the longest path length exists between the input of the feed path 602 and the top right unit cell 402. As with the supercells 526 themselves, without compensation, these different path lengths would cause different portions of an optical signal to reach the unit cells 402 at different times. In some cases, the phase shifts provided by the modulators 408 in the unit cells 402 can, among other things, be used to compensate for the different path lengths between the input of the feed path 602 and each unit cell 402. Also or alternatively, linear or other phase shifters may be used to compensate for the different path lengths between the input of the feed path 602 and each unit cell 402.

Note that if each supercell 526 includes a 32×32 arrangement of unit cells 402, each supercell 526 would include thirty-two rows of unit cells 402, where each row includes thirty-two unit cells 402. Thus, the portion 538 shown in FIG. 6 would be replicated sixteen times within each supercell 526. However, it is possible for the supercells 526 to each have a different number and arrangement of unit cells 402 as needed or desired.

In some embodiments, all of the components in the architecture 500 of FIG. 5 may be implemented in an integrated manner, such as when implemented using a single integrated electrical and photonic chip. As noted above, for example, different components of the architecture 500 may be fabricated using silicon and silicon nitride, which enables fabrication using standard silicon-based processes. When implemented in an integrated manner, the architecture 500 may be implemented using a single photonic integrated circuit chip, and there may be no need for components such as the fiber inputs/outputs 210, fiber mounts 304, and optical fibers 306. However, integration of the components in the architecture 500 is not necessarily required. Thus, for example, the source laser 502 may be implemented off-chip or replaced using a standard erbium-doped fiber amplifier laser or other external laser. As another example, the receiver 506 may be implemented off chip.

Although FIGS. 5 and 6 illustrate one example of an architecture 500 of a photonic integrated circuit 302 supporting a PIC-based optical phased array, various changes may be made to FIGS. 5 and 6. For example, this particular embodiment logically splits the photonic integrated circuit 302 in half by using two waveguides 524a-524b, two sets of splitters 528a-528b, 530a-530b, and two sets of time delay paths 532a-532b. However, the photonic integrated circuit 302 may be logically split into other numbers of portions or not logically split. Also, various components in FIGS. 5 and 6 may be combined, further subdivided, replicated, omitted, or rearranged and additional components may be added according to particular needs.

As described above, various modulators (such as the modulators 408 and modulators implementing the phase shifters 514) may be implemented in various ways. In some embodiments, optical phase shifts may be provided using a modulator by (i) changing the index of refraction of a waveguide carrying an optical signal or (ii) changing the charge carrier density of a waveguide carrying an optical signal. The first approach may be achieved using thermal resonators, and the second approach may be achieved using PN junction micro-ring modulators. One possible advantage of PN junction micro-ring modulators over thermal resonators is power consumption, since PN junction micro-ring modulators may consume very small amounts of power (such as less than 10 μW each).

Figure 7B:
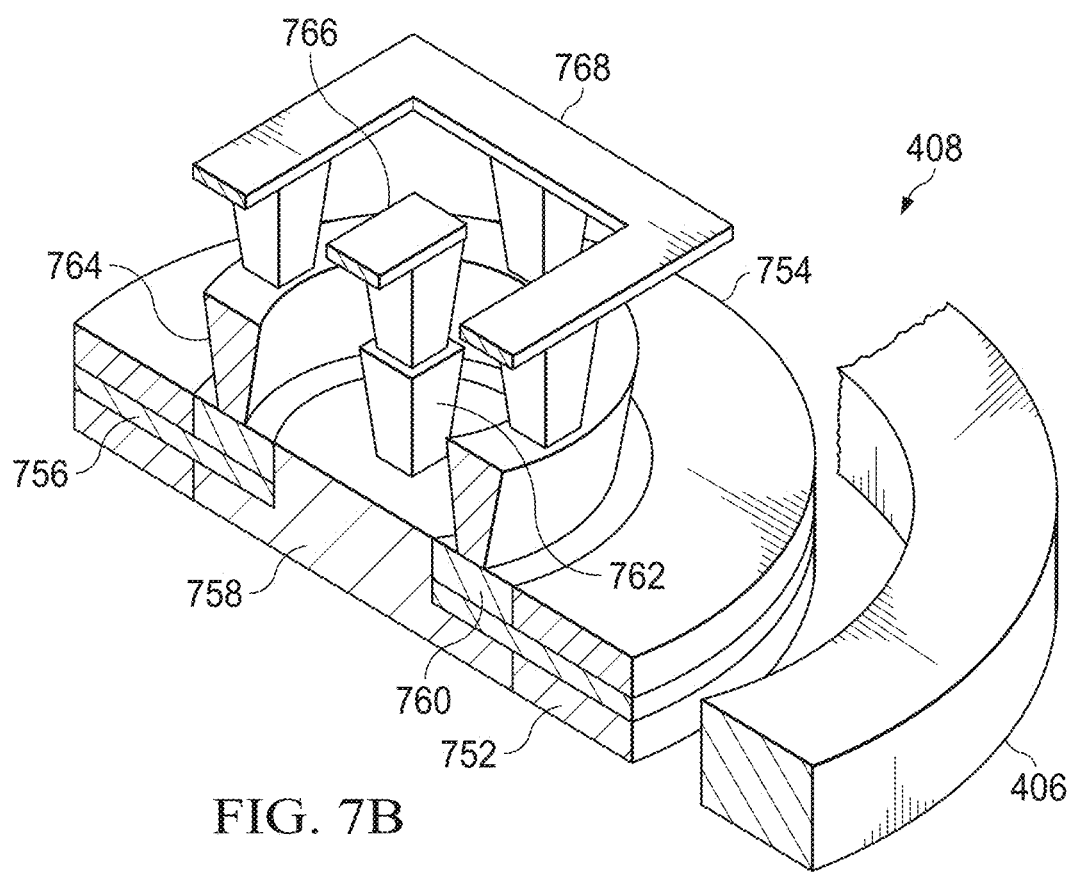

FIGS. 7A and 7B illustrate example modulators 408 in a photonic integrated circuit 302 according to this disclosure. The same or similar types of structures may be used in the phase shifters 514. As shown in FIG. 7A, the modulator 408 here represents a thermal resonator that is implemented using a micro-ring resonator 702 and a heater 704 positioned within or otherwise near the micro-ring resonator 702. The micro-ring resonator 702 resonates based on an optical signal flowing through an associated signal pathway 406. Varying the temperature of the micro-ting resonator 702 alters the resonance wavelength of the micro-ring resonator 702, thereby changing the phase of the optical signal flowing through the signal pathway 406. Voltages can be applied to the heater 704 via two electrical contacts 706a-706b in order to create the desired temperature change and therefore implement the desired phase shift of the optical signal flowing through the signal pathway 406. The voltages applied to the electrical contacts 706a-706b can represent the output voltages from the amplifiers 416 and 418. When the modulator 408 is used in a unit cell 402, different voltages applied to the heater 704 by the corresponding DRIIC cell 412 can cause different phase shifts to occur in the modulator 408.

The micro-ring resonator 702 may be formed from any suitable material(s), such as silicon, and in any suitable manner. The heater 704 may be formed from any suitable material(s), such as one or more metals, and in any suitable manner. The micro-ting resonator 702 may be separated from the heater 704 by any suitable material(s), such as silicon dioxide. The micro-ring resonator 702 and heater 704 may each have any suitable size, shape, and dimensions. In some embodiments, the micro-ring resonator 702 is annular and has a diameter of about 5.5 µm, and the heater 704 is circular and fits within the micro-ring resonator 702. However, other shapes and sizes may be used here. The electrical contacts 706a-706b here can be coupled to the outputs of the corresponding DRIIC cell 412 or another component in any suitable manner, such as via flip-chip bonding. A gap 708 between the micro-ring resonator 702 and the signal pathway 406 may have any suitable value, such as about 150 nm to about 210 nm (±10 nm). In some cases, design parameters like the thickness of the micro-ring resonator 702 or the size of the gap 708 can be altered in order to provide desired functionality for the phase modulator 408.

As shown in FIG. 7B, the modulator 408 here represents a PN junction micro-ring modulator that is implemented using various regions of semiconductor material, such as doped and undoped silicon. In this example, the modulator 408 is shown in cross-section for explanation. Here, the modulator 408 includes a first annular semiconductor region 752 separated from a second annular semiconductor region 754. The annular semiconductor regions 752 and 754 can represent different types of semiconductor material, such as when the annular semiconductor region 752 represents an N-type semiconductor material and the annular semiconductor region 754 represents a P-type semiconductor material. A semiconductor region 756 (such as undoped silicon) can separate the regions 752-754. A doped semiconductor region 758 is positioned within the annular regions 752-754, and a doped semiconductor region 760 is positioned around an upper portion of the doped semiconductor region 758. The doped semiconductor regions 758 and 760 can represent different regions of semiconductor material with different dopants, such as when the doped semiconductor region 758 is doped with an N+ dopant and the doped semiconductor region 760 is doped with a P+ dopant. An electrical contact 762 can be used to form an electrical connection with the doped semiconductor region 758, and an electrical contact 764 can be used to form an electrical connection with the doped semiconductor region 760. An electrical connection 766 can be used to provide a voltage to the electrical contact 762, and an electrical connection 768 can be used to provide a voltage to the electrical contact 764.

Here, the various semiconductor regions 752-760 form a PN junction micro-ring modulator, and the electrical contacts 762, 764 and electrical connections 766, 768 allow voltages to be applied that alter the charge carrier density of the PN junction micro-ring modulator. This alters the phase of an optical signal flowing through the associated signal pathway 406. When the modulator 408 is used in a unit cell 402, the electrical connections 766, 768 here can be coupled to the outputs of the corresponding DRIIC cell 412 in any suitable manner, such as via flip-chip bonding. Voltages applied to the electrical connections 766, 768 can provide the desired voltage difference and therefore implement the desired phase shift of the optical signal flowing through the signal pathway 406. The voltages applied to the electrical connections 766, 768 can represent the output voltages from the amplifiers 416 and 418. As noted above, different voltages applied to the electrical connections 766, 768 by the corresponding DRIIC cell 412 or another component can cause different phase shifts to occur in the modulator 408.

Although FIGS. 7A and 7B illustrate examples of a modulator 408 in a photonic integrated circuit 302, various changes may be made to FIG. 7. For example, the actual structure of a thermal resonator or PN junction micro-ring modulator can vary as needed or desired. Also, any other suitable structure may be used to modulate an optical signal in the photonic integrated circuit 302.

Figure 8:
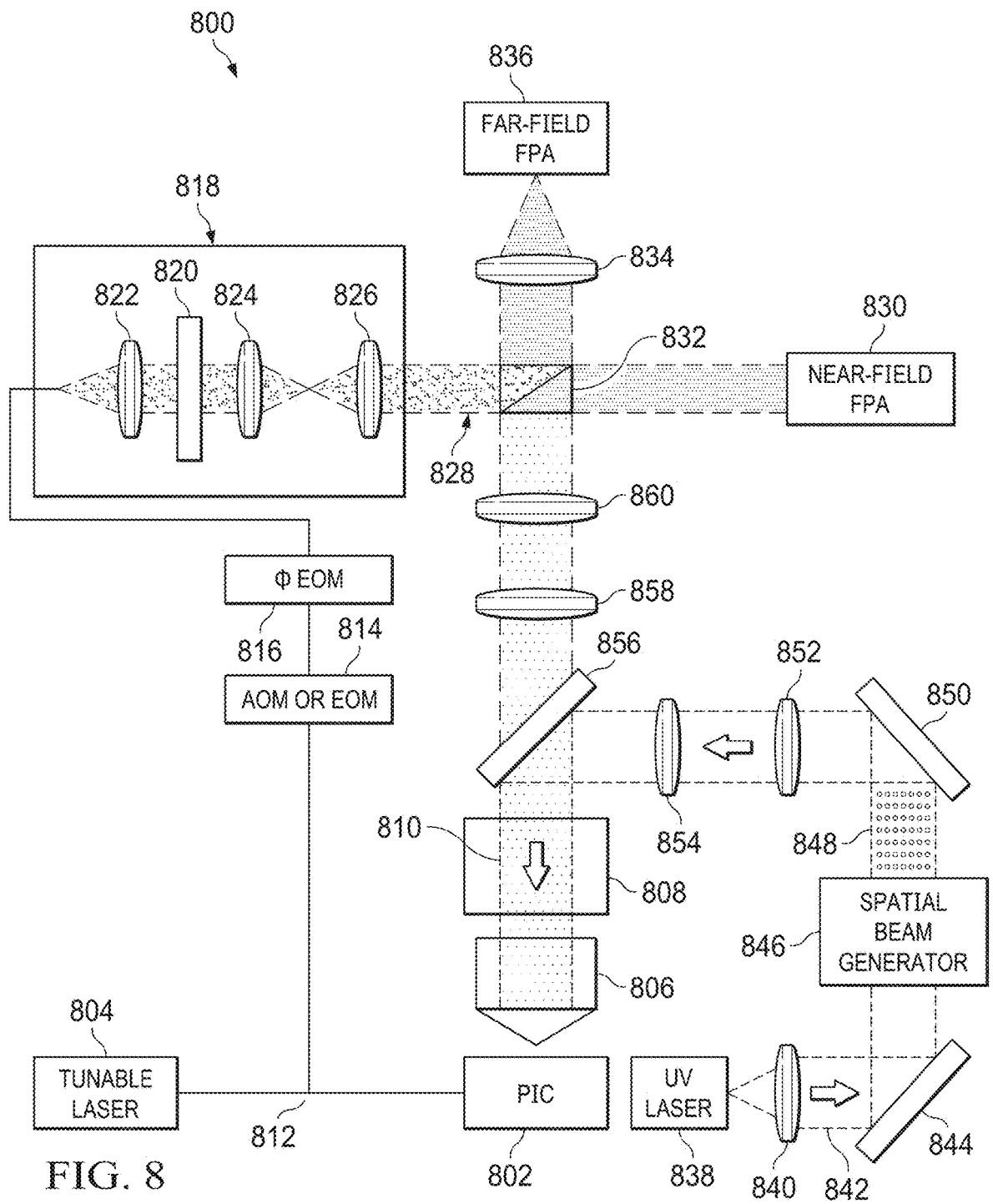
FIGS. 8 and 9 illustrate an example system supporting parallel real-time PIC-based optical phased array calibration and ultraviolet laser micro-ring wavelength offset trimming according to this disclosure.
Figure 9:
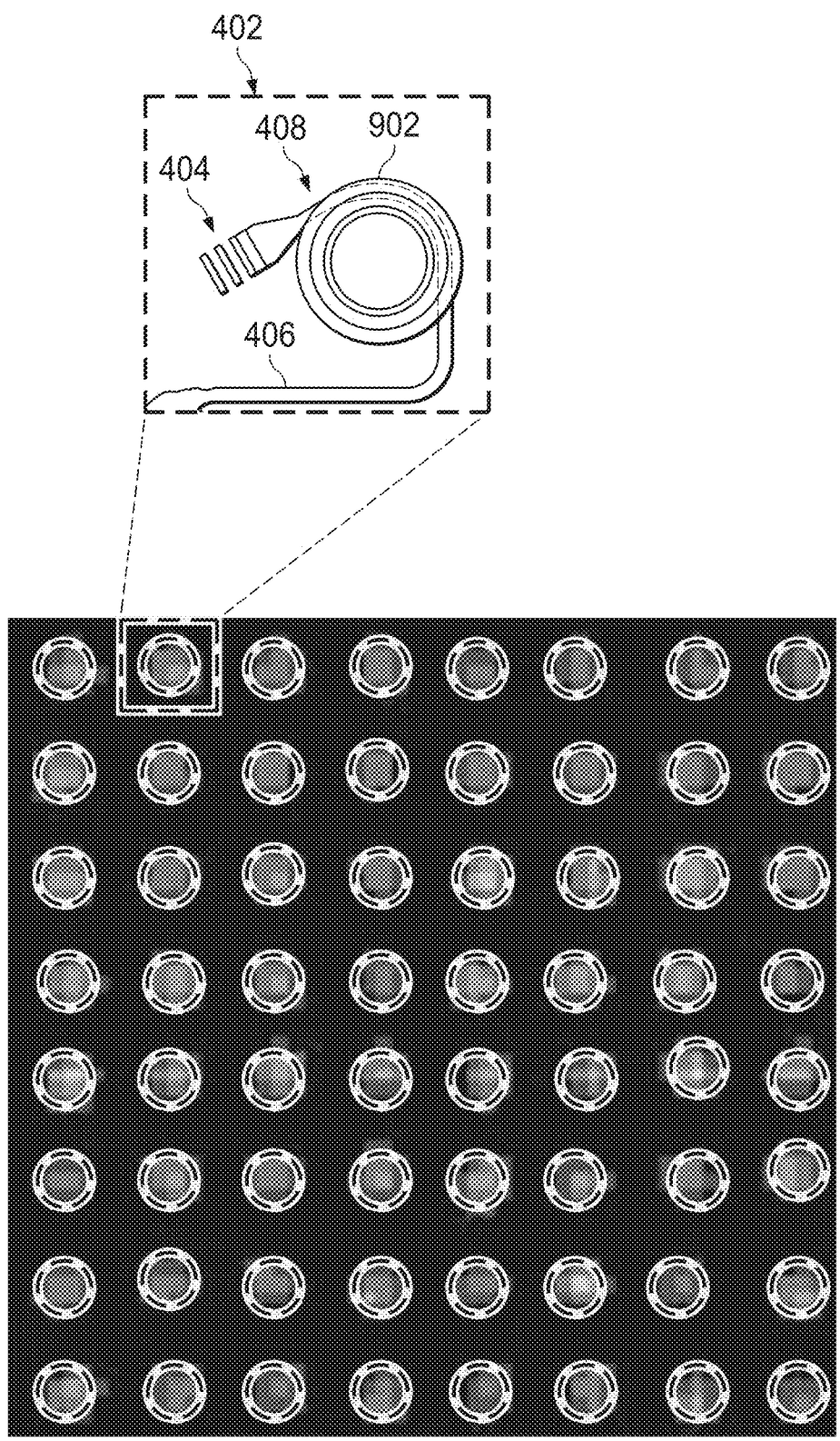

FIGS. 8 and 9 illustrate an example system 800 supporting parallel real-time PIC-based optical phased array calibration and ultraviolet laser micro-ring wavelength offset trimming according to this disclosure. The system 800 can be used to (among other things) tune the modulators 408 in a photonic integrated circuit 302, such as by changing the center wavelengths of at least some of the modulators 408 so that the modulators 408 have substantially equal center wavelengths or other desired center wavelengths.

As shown in FIG. 8, in this example, a PIC 802 (which may represent the photonic integrated circuit 302) represents or includes an optical phased array with the modulators 408 being calibrated. A tunable laser 804 generates a tunable input beam, most of which is provided to the PIC 802 and causes the PIC 802 to produce an optical output. The optical output in this example passes through a microscope objective lens 806 and a tube lens 808, which produces a first optical beam 810. The first optical beam 810 is composed of the optical signals produced by the unit cells 402 of the PIC 802.

A fiber tap 812 splits off a portion of the tunable input beam from the laser 804, and this portion of the tunable input beam represents a reference signal used in the system 800. An amplitude or intensity modulator 814, such as an acousto-optic modulator (AOM) or an electro-optic modulator (EOM), can be used to turn the reference signal on and off in order to collect background and antenna emission intensities as a function of the phase tuning of the modulators 408. A phase modulator 816 can shift the phase of the reference signal as modified by the modulator 814 by $\theta$ and $\theta+\pi/2$. This helps to maximize the contrast ratio of $I(\theta)/I(\theta+\pi/2)$ of the antenna phase to the reference signal as the phase angle $\theta$ is scanned (where $I(\cdot)$ represents intensity). This allows a pure phase shift to be determined, which decouples the amplitude effects associated with phase tuning of thermal resonators (note that decoupling of amplitude and phase effects is not required if PN junction micro-ring modulators are used for phase control).

A mask assembly 818 may optionally be used here to apply a mask to the phase-shifted reference signal, which allows for the generation of a dark field image with minimal background. The dark field with an image-relayed mask can therefore be used for heterodyne mixing to reduce the measurement noise floor. In this example, the mask assembly 818 includes a mask 820, which helps to ensure that there is minimal background in the dark field image. In some cases, the mask 820 may be programmable, such as when the mask 820 represents a spatial light modulator. A lens 822 expands the reference signal prior to passing through the mask 820, and lenses 824 and 826 invert the reference signal after passing through the mask 820 to produce a second optical beam 828 representing the dark field image.

The first optical beam 810 and the second optical beam 828 are mixed, and at least a portion of the mixed beam is provided to a near-field focal plane array (FPA) or other near-field imaging sensor 830. The imaging sensor 830 can capture one or more images of the mixed beam, and the image(s) can be used to identify whether or not the array elements of the PIC 802 are properly in phase. The mixing of the beams 810 and 828 may be performed using any suitable optical device(s). If desired, the mixing may be performed using a beam splitter 832, which also allows another portion of the mixed beam to be focused by a lens 834 onto a far-field focal plane array or other far-field imaging sensor 836. The imaging sensor 836 can capture one or more images of the mixed beam from the lens 834, which again allows the image(s) to be used to identify whether or not the array elements of the PIC 802 are properly in phase. The imaging sensors 830 and 836 represent any suitable devices configured to capture optical information, such as charge-coupled devices (CCDs) or other sensors. Among other things, the information captured by the imaging sensor(s) 830 and 836 can be used to identify how the phases and amplitudes of signals generated by the unit cells 402 of the PIC 802 vary as the phase angle θ is scanned. This information can be used to identify phase curves and emitter amplitudes for the unit cells 402 of the PIC 802. In some embodiments, such phase curves and emitter amplitudes may be used to identify the center wavelengths of the modulators 408 (which then allows the center wavelengths of the modulators 408 to be modified if needed).

To support modifications to the center wavelengths of the modulators 408, the system 800 also includes a UV laser light source 838, which is configured to generate UV illumination. The UV laser light source 838 includes any suitable structure configured to generate UV illumination in adequate amounts for modifying the index of refraction of various portions of the PIC 802. In this example, the UV illumination is modified by a lens 840 to produce an initial UV beam 842, and at least one mirror 844 (such as a highly-reflective ultraviolet mirror) can be used to redirect the initial UV beam 842 as needed or desired.

A spatial beam generator 846 uses the initial UV beam 842 to produce a spatially-controlled UV beam 848. The spatially-controlled UV beam 848 may contain UV illumination only in desired portions of the beam 848. Ideally, the UV illumination is contained only in portions of the beam 848 that will eventually strike the PIC 802 at desired locations. The spatial beam generator 846 includes any suitable structure configured generate spatially-controlled UV illumination. In some embodiments, the spatial beam generator 846 may include a diffractive optic or a controllable optical phased array, such as a liquid crystal array. Also, the spatial beam generator 846 may produce the spatially-controlled UV beam 848 so that the spatially-controlled UV beam 848 can be used to simultaneously modify any desired number of modulators 408 in the PIC 802. In some cases, for instance, the spatially-controlled UV beam 848 may be used to simultaneously modify a 32×32, 64×64, or 128×128 array of modulators 408, although other individual modulators 408 or arrays of modulators 408 may be modified as needed or desired (and the arrays of modulators 408 need not be square). In addition, the spatial beam generator 846 may be capable of selectively blocking UV illumination from reaching certain modulators 408 at various times, in which case the spatial beam generator 846 may provide temporal control of the UV illumination reaching the modulators 408. However, in other cases, a separate temporal controller may be provided to selectively pass UV illumination or block UV illumination from reaching specified modulators 408.

At least one mirror 850 (such as a highly-reflective ultraviolet mirror) can be used to redirect the spatially-controlled UV beam 848 as needed or desired, and one or more relay lenses 852 and 854 or other optical devices may be used to provide the spatially-controlled UV beam 848 to a dichroic mirror 856. The dichroic mirror 856 is configured to reflect the spatially-controlled UV beam 848 while allowing passage of the optical beam 810. This allows the spatially-controlled UV beam 848 to follow the same path into the PIC 802 that is followed by the optical beam 810 exiting the PIC 802. Also, one or more relay lenses 858 and 860 or other optical devices may be used to provide the optical beam 810 to the beam splitter 832. The spatially-controlled UV beam 848 is reflected from the dichroic mirror 856 and passes through the tube lens 808 and the microscope objective lens 806 onto the PIC 802.

The UV illumination reaching the PIC 802 can be used to modify the index of refraction of various portions of the PIC 802. For example, the UV illumination can be used to modify the index of refraction of portions of silicon around the modulators 408 or the associated signal pathways 406 traveling around the modulators 408. As a particular example, the UV illumination can be used to modify the index of refraction of different portions of claddings that surround the modulators 408 or the associated signal pathways 406. Note that the modified portions of material may be inside or outside of the modulators 408 and may be above or below the modulators 408. In some cases, changes inside or outside of the modulators 408 may be used to alter the TE mode resonance of the modulators 408, and changes above or below the modulators 408 may be used to alter the TM mode resonance of the modulators 408.

In some embodiments, the modifications being performed here can be based on the following. When an optical signal travels through a signal pathway and interacts with a phase modulator 408, the coupled resonator-waveguide transmission of the optical signal may be defined as follows:

$$T(\omega) = \left| \frac{2i(\omega) - (\omega_0)/\omega_0 + 1/Q_0 - 1/Q_c}{2i(\omega - \omega_0)/\omega_0 + 1/Q_0 + 1/Q_c} \right|^2 \equiv |\tilde{T}|^2 \quad (1)$$

where:

$$\frac{\omega_0}{k} = \frac{c}{n_{eff}}$$

$$\omega_0 = \frac{2\pi mc}{n_{eff} L_{ring}}$$

Here, ω represents the frequency of the optical signal, and $\omega_0$ represents the resonance frequency of the phase modulator. Also, $Q_0$ represents the intrinsic quality factor and $Q_c$ represents the coupling quality factor between the phase modulator and the signal pathway carrying the optical signal. The function $T_{(\omega)}$ represents transmittance of the optical signal as a function of frequency, and $\tilde{T}$ represents the complex coefficient of transmission. In addition, k represents a wavevector, m represents the mode order of the phase modulator, $n_{eff}$ represents the effective index of refraction of the phase modulator, and $L_{ring}$ represents the length of the phase modulator. It is possible to control the phase modulator's effective index of refraction ($n_{eff}$) and change it slightly, such as through the use of the UV illumination on the silicon material around the phase modulator or the associated signal pathway. Thus, the center wavelengths of the modulators 408 can be modified and therefore tuned as needed or desired.

Note here that the UV illumination is being utilized as an extra image plane in the heterodyne calibration process, where the UV illumination is injected in the opposite direction through the microscope as the illumination being produced by the PIC 802. This arrangement allows the operation of the modulators 408 to be examined in real-time as the UV illumination is being used to modify the center wavelengths of the modulators 408. In some embodiments, when each specific modulator 408 reaches a desired center wavelength, the UV illumination for that modulator 408 can be blocked, thereby preventing further modifications to that modulator 408. This approach therefore allows the modulators 408 to be modified in real-time and allows each modulator 408 to precisely obtain a desired center wavelength. Moreover, the spatial beam generator 846 can control the UV illumination so that the UV illumination strikes any desired portion or portions of each modulator 408, such as when the spatial beam generator 846 can control the UV illumination to create an arc, circle, annulus, pair of concentric annuluses, or other shape(s) for each modulator 408. In some cases, the UV illumination may be processed to have a uniform-step far-field in order to more carefully control the modifications being made or to minimize exposure of other components to the UV illumination.

Also note that modifications of the index of refraction of silicon are specifically mentioned above. This may allow, for instance, a back-etched silicon wafer to be used to form the PIC 802, which can facilitate UV laser modifications to the index of refraction of various portions of the PIC 802. However, any other suitable materials may be used here. For example, wafer substrates formed from materials such as quartz, fused silica, silicon nitride, or gallium nitride may be used since these materials can also facilitate UV laser modifications to the index of refraction of one or more portions of the PIC 802.

As shown in FIG. 9, one example of the UV illumination of the unit cells 402 in the PIC 802 is illustrated. Here, a portion 902 of each unit cell 402 may be illuminated using the UV illumination. This portion 902 may include a cladding around the modulator 408 or other portion of material around the modulator 408 or the associated signal pathway 406. These portions 902 of the unit cells 402 can be modified simultaneously using the UV illumination, and the illumination of each unit cell 402 may stop once its modulator 408 reaches a desired center wavelength.

Note that any suitable wavelength(s) of UV illumination may be used here to change the center wavelength of a modulator 408. In some embodiments, the wavelength(s) of the UV illumination may depend on the particular material being illuminated. In particular embodiments, different wavelengths of UV illumination may be used to achieve different modifications. For example, some UV wavelengths may cause the index of refraction of a material to decrease, while other UV wavelengths may cause the index of refraction of the material to increase.

Once the modulators 408 of the PIC 802 have been modified as desired, the UV laser light source 838 can be deactivated, and the optical beam 810 from the PIC 802 can be analyzed to identify how the modulators 408 of the PIC 802 now behave in response to different inputs, such as different voltages or temperatures. This information can be stored as calibration data, such as in the registers 414 of the DRIIC cells 412, for later use during operation of the PIC 802.

Although FIGS. 8 and 9 illustrate one example of a system 800 supporting parallel real-time PIC-based optical phased array calibration and ultraviolet laser micro-ring wavelength offset trimming, various changes may be made to FIGS. 8 and 9. For example, the portions 902 of the unit cells 402 being illuminated can vary depending on the implementation of the PIC 802. Also, components can be added, omitted, combined, further subdivided, replicated, or placed in any other suitable configuration in the system 800 according to particular needs.

Figure 10A:
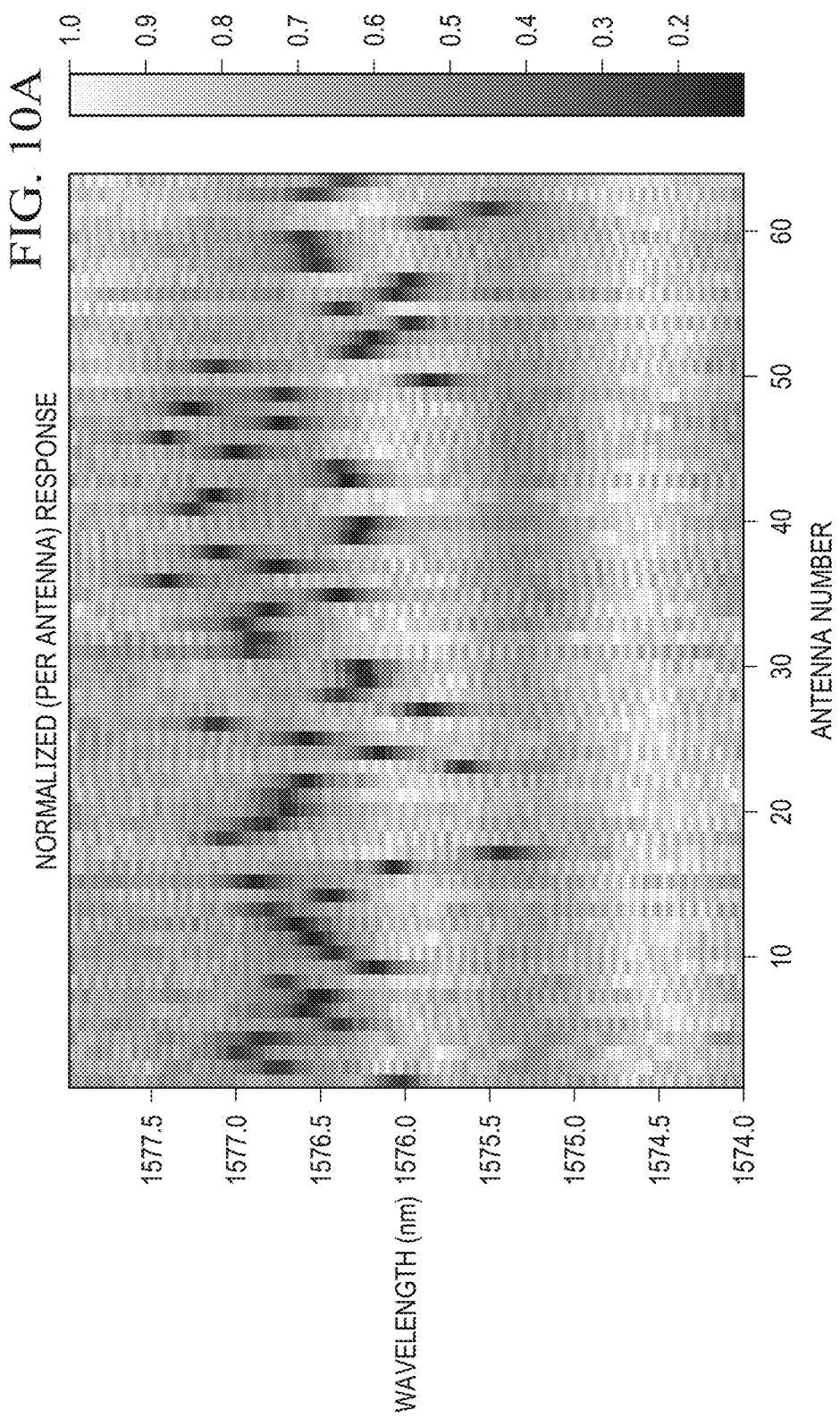

FIGS. 10A and 10B illustrate example results from parallel real-time PIC-based optical phased array calibration and ultraviolet laser micro-ring wavelength offset trimming according to this disclosure. As shown in FIG. 10A, a graph 1000 plots the center wavelengths of a set of modulators 408 prior to compensation. The darkest areas of the graph 1000 identify the center wavelengths of the modulators 408. As can be seen here, the center wavelengths of the modulators 408 have quite a bit of variability. Without compensation, electrical signals would need to be applied to a number of the modulators 408 so that the modulators can all obtain substantially equal center wavelengths.

As shown in FIG. 10B, a graph 1002 plots the center wavelengths of the same set of modulators 408 after compensation, such as after processing within the system 800. Again, the darkest areas of the graph 1002 identify the center wavelengths of the modulators 408. As can be seen here, the center wavelengths of the modulators 408 are much closer together. As a result, fewer or no electrical signals would need to be applied to the modulators 408 so that the modulators would all have substantially equal center wavelengths. This can significantly reduce power consumption by the photonic integrated circuit 302 and simplify the control schemes used with the photonic integrated circuit 302.

Although FIGS. 10A and 10B illustrate examples of results from parallel real-time PIC-based optical phased array calibration and ultraviolet laser micro-ring wavelength offset trimming, various changes may be made to FIGS. 10A and 10B. For example, the number of modulators 408 and the center wavelengths of the modulators 408 can easily vary from what is shown here. In general, FIGS. 10A and 10B are merely meant to graphically illustrate an example of the type of results that may be obtained using the approaches described in this patent document, The exact results that are Obtained for any particular photonic integrated circuit 302 can vary based on various factors, such as how well the UV illumination is directed towards the unit cells 402.

Figure 11:
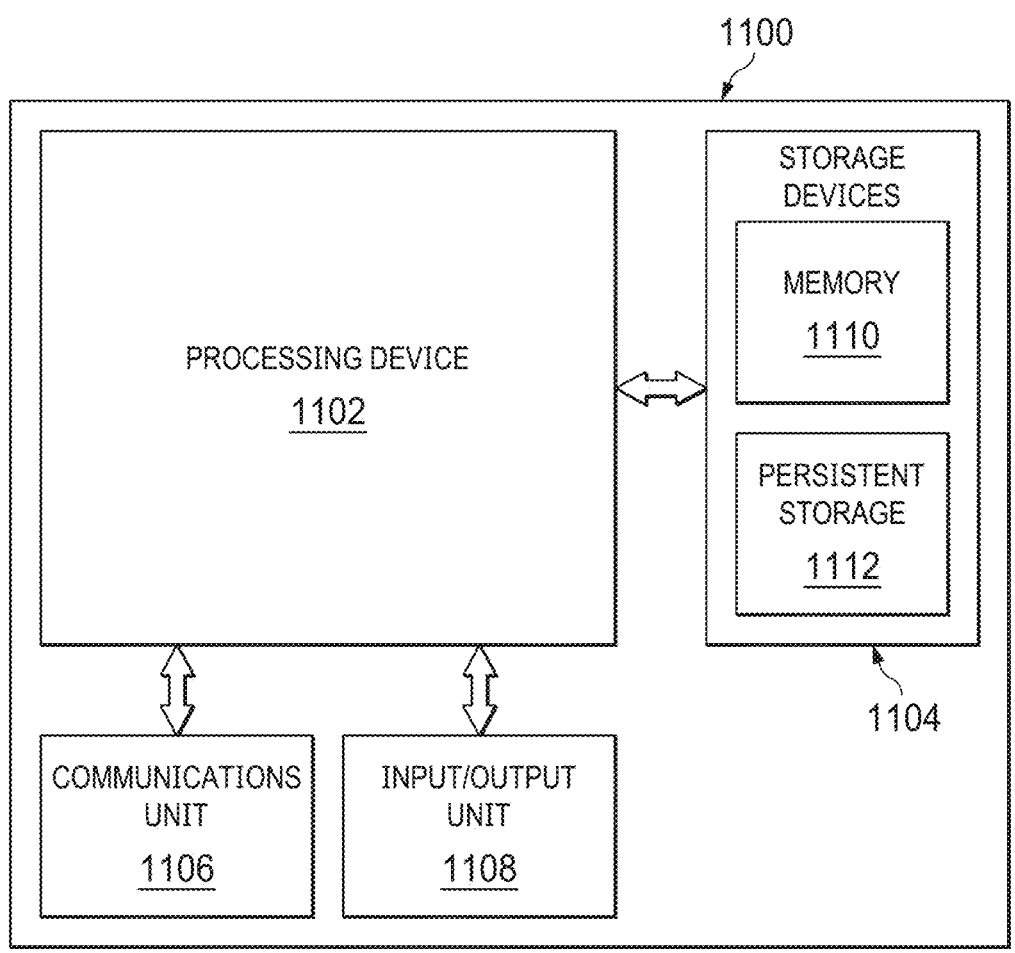
FIG. 11 illustrates an example device supporting parallel real-time PIC-based optical phased array calibration and ultraviolet laser micro-ring wavelength offset trimming according to this disclosure.

FIG. 11 illustrates an example device 1100 supporting parallel real-time PIC-based optical phased array calibration and ultraviolet laser micro-ring wavelength offset trimming according to this disclosure. The device 1100 may, for example, be used to process images from the imaging sensor(s) 830, 836 and other data in order to control the operations of the UV laser light source 838, spatial beam generator 846, or other component(s). The device 1100 can perform these functions in order to control how the modulators 408 are modified in the system 800.

As shown in FIG. 11, the device 1100 denotes a computing device or system that includes at least one processing device 1102, at least one storage device 1104, at least one communications unit 1106, and at least one input/output (I/O) unit 1108. The processing device 1102 may execute instructions that can be loaded into a memory 1110. The processing device 1102 includes any suitable number(s) and type(s) of processors or other processing devices in any suitable arrangement. Example types of processing devices 1102 include one or more microprocessors, microcontrollers, digital signal processors (DSPs), application specific integrated circuits (ASICs), field programmable gate arrays (FPGAs), or discrete circuitry.

The memory 1110 and a persistent storage 1112 are examples of storage devices 1104, which represent any structure(s) capable of storing and facilitating retrieval of information (such as data, program code, and/or other suitable information on a temporary or permanent basis). The memory 1110 may represent a random access memory or any other suitable volatile or non-volatile storage device(s). The persistent storage 1112 may contain one or more components or devices supporting longer-term storage of data, such as a read only memory, hard drive, Flash memory, or optical disc.

The communications unit 1106 supports communications with other systems or devices. For example, the communications unit 1106 can include a network interface card or a wireless transceiver facilitating communications over a wired or wireless network. The communications unit 1106 may support communications through any suitable physical or wireless communication link(s).

The I/O unit 1108 allows for input and output of data. For example, the 110 unit 1108 may provide a connection for user input through a keyboard, mouse, keypad, touchscreen, or other suitable input device. The I/O unit 1108 may also send output to a display, printer, or other suitable output device. Note, however, that the 170 unit 1108 may be omitted if the device 1100 does not require local I/O, such as when the device 1100 represents a server or other device that can be accessed remotely.

In some embodiments, the processing device 1102 is configured to control the calibration of a photonic integrated circuit in the system 800. For example, the processing device 1102 may identify center wavelengths of the modulators 408 in the PIC 802, such as based on images from the imaging sensor(s) 830 and 836. The processing device 1102 may also control various components of the system 800 (such as the UV laser light source 838 or spatial beam generator 846) to cause UV illumination to be directed onto at least a subset of the unit cells 402 simultaneously, which helps to change the center wavelengths of at least a subset of the modulators 408 in the PIC 802. In some cases, the processing device 1102 can spatially control the ultraviolet illumination so that the ultraviolet illumination strikes desired portions of the illuminated unit cells 402. Also, in some cases, the processing device 1102 can temporally control the ultraviolet illumination so that the ultraviolet illumination strikes each of the illuminated unit cells 402 for a desired amount of time. Note that both spatial and temporal control can be performed here. In addition, the processing device 1102 can monitor changes to the center wavelengths of the modulators 408 (possibly in real-time).

Although FIG. 11 illustrates one example of a device 1100 supporting parallel real-time PIC-based optical phased array calibration and ultraviolet laser micro-ring wavelength offset trimming, various changes may be made to FIG. 11. For example, computing and communication devices and systems come in a wide variety of configurations, and FIG. 11 does not limit this disclosure to any particular computing or communication device or system.

Figure 12:
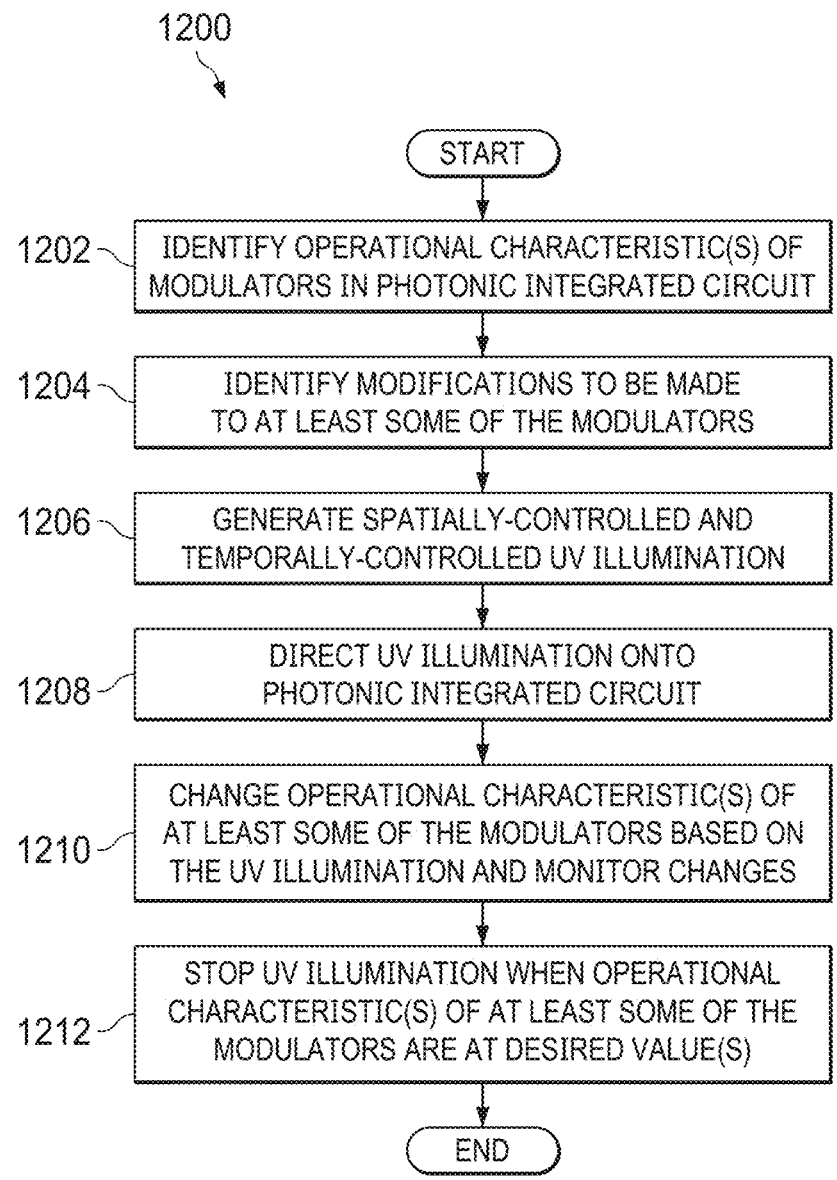
FIG. 12 illustrates an example method for parallel real-time PIC-based optical phased array calibration and ultraviolet laser micro-ring wavelength offset trimming according to this disclosure.

FIG. 12 illustrates an example method 1200 for parallel real-time PIC-based optical phased array calibration and ultraviolet laser micro-ring wavelength offset trimming according to this disclosure. For ease of explanation, the method 1200 is described as being performed using the system 800 of FIG. 8 and the device 1100 of FIG. 11. However, the method 1200 may be performed using any other suitable device(s) and any other suitable system(s).

As shown in FIG. 12, one or more operational characteristics of modulators in a photonic integrated circuit are identified at step 1202. This may include, for example, the processing device 1102 identifying a center wavelength of each modulator 408 based on one or more images from the imaging sensor(s) 830, 836 or other data. Modifications to be made to at least some of the modulators are identified at step 1204. This may include, for example, the processing device 1102 identifying desired changes to the index of refraction in one or more unit cells 402 so that the modulators 408 obtain at least one desired center wavelength.

Spatially-controlled and temporally-controlled UV illumination is generated at step 1206 and directed onto the photonic integrated circuit at step 1208. This may include, for example, the processing device 1102 controlling the UV laser light source 838, spatial beam generator 846, or other component(s) of the system 800 to produce a spatially-controlled UV beam 848. This may also include passing the spatially-controlled UV beam 848 into the photonic integrated circuit in the opposite direction as an optical beam 810 being generated by the photonic integrated circuit. The UV illumination is used here to illuminate at least a subset of the unit cells 402.

The UV illumination changes the operational characteristic(s) of at least some of the modulators and the changes are monitored at step 1210. This may include, for example, the UV illumination modifying the index of refraction of one or more portions 902 of at least the subset of the unit cells 402 in the photonic integrated circuit, which can change the center wavelengths of at least a subset of the modulators 408 in the photonic integrated circuit. This may also include the processing device 1102 receiving one or more additional images from the imaging sensor(s) 830, 836 or other additional data to identify how the center wavelengths of the modulators 408 are being modified in real-time. This process can continue until the operational characteristic(s) of at least some of the modulators has at least one desired value, in which case the UV illumination can stop at step 1212. This may include, for example, the processing device 1102 blocking additional UV illumination from reaching a unit cell 402 having a modulator 408 with a desired center wavelength. Note that this may occur for individual modulators 408 or groups of modulators 408, meaning the illumination of some unit cells 402 may stop while other unit cells 402 are still being illuminated.

Although FIG. 12 illustrates one example of a method 1200 for parallel real-time PIC-based optical phased array calibration and ultraviolet laser micro-ring wavelength offset trimming, various changes may be made to FIG. 12. For example, while shown as a series of steps, various steps in FIG. 12 may overlap, occur in parallel, occur in a different order, or occur any number of times.

The following describes example embodiments of this disclosure that implement or relate to a system and method for parallel real-time PIC optical phased array calibration and ultraviolet laser micro-ring wavelength offset trimming. However, other embodiments may be used in accordance with the teachings of this disclosure.

In a first embodiment, a method includes obtaining a photonic integrated circuit having an optical phased array. The optical phased array includes multiple unit cells, and each unit cell includes (i) an antenna element configured to transmit or receive optical signals and (ii) a modulator configured to modify phases of the optical signals. The method also includes identifying center wavelengths of the modulators in the optical phased array. The method further includes directing ultraviolet illumination onto at least a subset of the unit cells simultaneously in order to change the center wavelengths of at least a subset of the modulators in the optical phased array. In addition, the method includes monitoring changes to the center wavelengths of at least the subset of the modulators in the optical phased array.

In a second embodiment, an apparatus is provided for use in calibrating a photonic integrated circuit having an optical phased array, where the optical phased array includes multiple unit cells and each unit cell includes (i) an antenna element configured to transmit or receive optical signals and (ii) a modulator configured to modify phases of the optical signals. The apparatus includes at least one processing device configured to identify center wavelengths of the modulators in the optical phased array, cause ultraviolet illumination to be directed onto at least a subset of the unit cells simultaneously in order to change the center wavelengths of at least a subset of the modulators in the optical phased array, and monitor changes to the center wavelengths of at least the subset of the modulators in the optical phased array.

In a third embodiment, a non-transitory computer readable medium is provided for use in calibrating a photonic integrated circuit having an optical phased array, where the optical phased array includes multiple unit cells and each unit cell includes (i) an antenna element configured to transmit or receive optical signals and (ii) a modulator configured to modify phases of the optical signals. The non-transitory computer readable medium contains instructions that when executed cause at least one processor to identify center wavelengths of the modulators in the optical phased array, cause ultraviolet illumination to be directed onto at least a subset of the unit cells simultaneously in order to change the center wavelengths of at least a subset of the modulators in the optical phased array, and monitor changes to the center wavelengths of at least the subset of the modulators in the optical phased array.

Any single one or any suitable combination of the following features may be used with the first, second, or third embodiment. The ultraviolet illumination may be spatially controlled so that the ultraviolet illumination strikes desired portions of at least the subset of the unit cells. The ultraviolet illumination may be temporally controlled so that the ultraviolet illumination strikes each of at least the subset of the unit cells for a desired time. A mixed optical beam may be generated using the optical phased array, and near-field measurements of the mixed optical beam may be captured. The mixed optical beam may be generated using optical signals that exit the optical phased array in a specified direction, and the ultraviolet illumination may be directed towards the optical phased array in an opposite direction. The ultraviolet illumination may modify an index of refraction of portions of at least the subset of the unit cells in order to change the center wavelengths of at least the subset of the modulators. The changes to the center wavelengths of at least the subset of the modulators may be monitored in real-time. The ultraviolet illumination may be directed onto an array of the unit cells, and the array of the unit cells may have a size of 32 unit cells by 32 unit cells or larger.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining a photonic integrated circuit comprising an optical phased array, the optical phased array comprising multiple unit cells, each unit cell comprising (i) an antenna element configured to transmit or receive optical signals and (ii) a modulator configured to modify phases of the optical signals;
identifying center wavelengths of the modulators in the optical phased array;
directing ultraviolet illumination onto at least a subset of the unit cells simultaneously in order to change the center wavelengths of at least a subset of the modulators in the optical phased array; and
monitoring changes to the center wavelengths of at least the subset of the modulators in the optical phased array.

2. The method of claim 1, wherein directing the ultraviolet illumination onto at least the subset of the unit cells comprises:
spatially controlling the ultraviolet illumination so that the ultraviolet illumination strikes desired portions of at least the subset of the unit cells.

3. The method of claim 1, wherein directing the ultraviolet illumination onto at least the subset of the unit cells comprises:
temporally controlling the ultraviolet illumination so that the ultraviolet illumination strikes each of at least the subset of the unit cells for a desired time.

4. The method of claim 1, further comprising:
generating a mixed optical beam using the optical phased array; and
capturing near-field measurements of the mixed optical beam;
wherein the mixed optical beam is generated using optical signals that exit the optical phased array in a specified direction, and the ultraviolet illumination is directed towards the optical phased array in an opposite direction.

5. The method of claim 1, wherein the ultraviolet illumination modifies an index of refraction of portions of at least the subset of the unit cells in order to change the center wavelengths of at least the subset of the modulators.

6. The method of claim 1, wherein monitoring the changes to the center wavelengths of at least the subset of the modulators occurs in real-time.

7. The method of claim 1, wherein directing the ultraviolet illumination onto at least the subset of the unit cells simultaneously comprises directing the ultraviolet illumination onto an array of the unit cells, the array of the unit cells having a size of 32 unit cells by 32 unit cells or larger.

8. An apparatus for use in calibrating a photonic integrated circuit comprising an optical phased array, the optical phased array comprising multiple unit cells, each unit cell comprising (i) an antenna element configured to transmit or receive optical signals and (ii) a modulator configured to modify phases of the optical signals, the apparatus comprising:
at least one processing device configured to:
identify center wavelengths of the modulators in the optical phased array;
cause ultraviolet illumination to be directed onto at least a subset of the unit cells simultaneously in order to change the center wavelengths of at least a subset of the modulators in the optical phased array; and
monitor changes to the center wavelengths of at least the subset of the modulators in the optical phased array.

9. The apparatus of claim 8, wherein the at least one processing device is configured to control the ultraviolet illumination spatially so that the ultraviolet illumination strikes desired portions of at least the subset of the unit cells.

10. The apparatus of claim 8, wherein the at least one processing device is configured to control the ultraviolet illumination temporally so that the ultraviolet illumination strikes each of at least the subset of the unit cells for a desired time.

11. The apparatus of claim 8, wherein:
the at least one processing device is further configured to obtain near-field measurements of a mixed optical beam generated using the optical phased array; and
the mixed optical beam is based on optical signals that exit the optical phased array in a specified direction, and the ultraviolet illumination is directed towards the optical phased array in an opposite direction.

12. The apparatus of claim 8, wherein the at least one processing device is configured to cause the ultraviolet illumination to be directed onto at least the subset of the unit cells in order to modify an index of refraction of portions of at least the subset of the unit cells.

13. The apparatus of claim 8, wherein the at least one processing device is configured to monitor the changes to the center wavelengths of at least the subset of the modulators in real-time.

14. The apparatus of claim 8, wherein the at least one processing device is configured to monitor the changes to the center wavelengths of an array of the unit cells, the array of the unit cells having a size of 32 unit cells by 32 unit cells or larger.

15. A non-transitory computer readable medium for use in calibrating a photonic integrated circuit comprising an optical phased array, the optical phased array comprising multiple unit cells, each unit cell comprising (i) an antenna element configured to transmit or receive optical signals and (ii) a modulator configured to modify phases of the optical signals, the non-transitory computer readable medium containing instructions that when executed cause at least one processor to:
identify center wavelengths of the modulators in the optical phased array;
cause ultraviolet illumination to be directed onto at least a subset of the unit cells simultaneously in order to change the center wavelengths of at least a subset of the modulators in the optical phased array; and
monitor changes to the center wavelengths of at least the subset of the modulators in the optical phased array.

16. The non-transitory computer readable medium of claim 15, wherein the instructions when executed cause the at least one processor to control the ultraviolet illumination spatially so that the ultraviolet illumination strikes desired portions of at least the subset of the unit cells.

17. The non-transitory computer readable medium of claim 15, wherein the instructions when executed cause the at least one processor to control the ultraviolet illumination temporally so that the ultraviolet illumination strikes each of at least the subset of the unit cells for a desired time.

18. non-transitory computer readable medium of claim 15, wherein the instructions when executed further cause the at least one processor to obtain near-field measurements of a mixed optical beam generated using the optical phased array, the mixed optical beam based on optical signals that exit the optical phased array in a specified direction, the ultraviolet illumination directed towards the optical phased array in an opposite direction.

19. The non-transitory computer readable medium of claim 15, wherein the instructions when executed cause the at least one processor to cause the ultraviolet illumination to be directed onto at least the subset of the unit cells in order to modify an index of refraction of portions of at least the subset of the unit cells.

20. The non-transitory computer readable medium of claim 15, wherein the instructions when executed cause the at least one processor to monitor the changes to the center wavelengths of at least the subset of the modulators in real-time.

* * * * *